United States Patent
Fehrenbach et al.

(10) Patent No.: US 11,489,639 B2
(45) Date of Patent: Nov. 1, 2022

(54) CONCEPTS FOR TRANSMITTING DATA TO ONE OR MORE USERS

(71) Applicant: Fraunhofer-Gesellschaft zur Foerderung der angewandten Forschung e.V., Munich (DE)

(72) Inventors: Thomas Fehrenbach, Berlin (DE); Baris Goektepe, Berlin (DE); Cornelius Hellge, Berlin (DE); Johannes Dommel, Berlin (DE); Lars Thiele, Berlin (DE)

(73) Assignee: Fraunhofer-Gesellschaft zur Foerderung der angewandten Forschung e.V., Munich (DE)

(*) Notice: Subject to any disclaimer, the term of this patent is extended or adjusted under 35 U.S.C. 154(b) by 250 days.

(21) Appl. No.: 16/787,795

(22) Filed: Feb. 11, 2020

(65) Prior Publication Data

US 2020/0177331 A1 Jun. 4, 2020

Related U.S. Application Data

(63) Continuation of application No. PCT/EP2018/071806, filed on Aug. 10, 2018.

(30) Foreign Application Priority Data

Aug. 11, 2017 (EP) .................... 17185935

(51) Int. Cl.
*H04L 5/00* (2006.01)
*H04B 7/024* (2017.01)
(Continued)

(52) U.S. Cl.
CPC .......... *H04L 5/0026* (2013.01); *H04B 7/024* (2013.01); *H04L 5/0035* (2013.01);
(Continued)

(58) Field of Classification Search
None
See application file for complete search history.

(56) References Cited

U.S. PATENT DOCUMENTS

| | | |
|---|---|---|
| 2010/0260288 A1 | 10/2010 | Aoki et al. |
| 2011/0007850 A1 | 1/2011 | Cao |

(Continued)

FOREIGN PATENT DOCUMENTS

| | | |
|---|---|---|
| CN | 103748802 A | 4/2014 |
| CN | 106304302 A | 1/2017 |

(Continued)

OTHER PUBLICATIONS

"3rd Generation Partnership Project; Technical Specification Group Radio Access Network; Study on Downlink Multiuser Superposition Transmission (MUST) for LTE (Release 13)", 3GPP Standard; 3GPP TR 36.859, 3rd Generation Partnership Project (3GPP), Mobile Competence Centre ; 650, Route Des Lucioles ; F-06921 Sophia-Antipolis Cedex ; France, vol. RAN WG1, No. V13.0.0, Jan. 8, 2016 (Jan. 8, 2016), p. 1-48, XP051047631, Jan. 8, 2016, pp. 1-48.

(Continued)

*Primary Examiner* — Otis L Thompson, Jr.
(74) *Attorney, Agent, or Firm* — Perkins Coie LLP; Michael A. Glenn

(57) ABSTRACT

A base station for a wireless communication network is provided. The wireless communication network includes a plurality of base stations, each base station to serve one or more users. One or more users are served by a plurality of base stations to receive a first data signal from the base station and a second data signal from at least one further base station using multi-user superposition transmission, MUST. The base station includes a backhaul interface for a communication with one or more of the plurality of base stations of the wireless communication network. For trans- (Continued)

mitting the first data signal to one or more users served by the base station and by the further base station, the base station is configured to negotiate a MUST setting with the further base station via the backhaul interface, and map data of the first data signal using a first transmit constellation set according to the negotiated MUST setting.

23 Claims, 15 Drawing Sheets

(51) Int. Cl.
  *H04W 72/04* (2009.01)
  *H04W 92/20* (2009.01)
(52) U.S. Cl.
  CPC ......... *H04L 5/0044* (2013.01); *H04W 72/044* (2013.01); *H04W 92/20* (2013.01)

(56) References Cited

U.S. PATENT DOCUMENTS

| | | | |
|---|---|---|---|
| 2017/0041906 A1 | 2/2017 | Tsai et al. | |
| 2017/0094668 A1* | 3/2017 | Tsai | H04W 52/346 |
| 2017/0331662 A1* | 11/2017 | Sun | H04L 27/3411 |
| 2018/0110017 A1* | 4/2018 | Jha | H04L 1/0011 |

FOREIGN PATENT DOCUMENTS

| | | |
|---|---|---|
| CN | 106685863 A | 5/2017 |
| CN | 106936750 A | 7/2017 |
| WO | 2017091029 A1 | 6/2017 |

OTHER PUBLICATIONS

"NGMN Alliance A White Paper "Small Cell Backhaul Requirements"", NGMN Alliance A White Paper, Version 1.0, Jun. 4, 2012, Jun. 4, 2012.

Dommel,Johannes et al., ""Coordinated Multipoint—Multiuser Superposition Transmission"", 21st International ITG Workshop on Smart Antennas (WSA 2017), Mar. 15, 2017 (Mar. 15, 2017), XP055511252, Mar. 15, 2017.

Shin, Wonjae et al., ""Non-Orthogonal Multiple Access in Multi-Cell Networks: Theory, Performance, and Practical Challenges"", arxiv.org, Cornell University Library, 201 OLIN Library Cornell University Ithaca, NY 14853,Nov. 5, 2016 (Nov. 5, 2016), XP080729612, Nov. 5, 2016.

Gao, Yalong, et al., "Research on 5G non-orthogonal user matching algorithm based on MCS selection", Information & Communications, 3 pp.

* cited by examiner

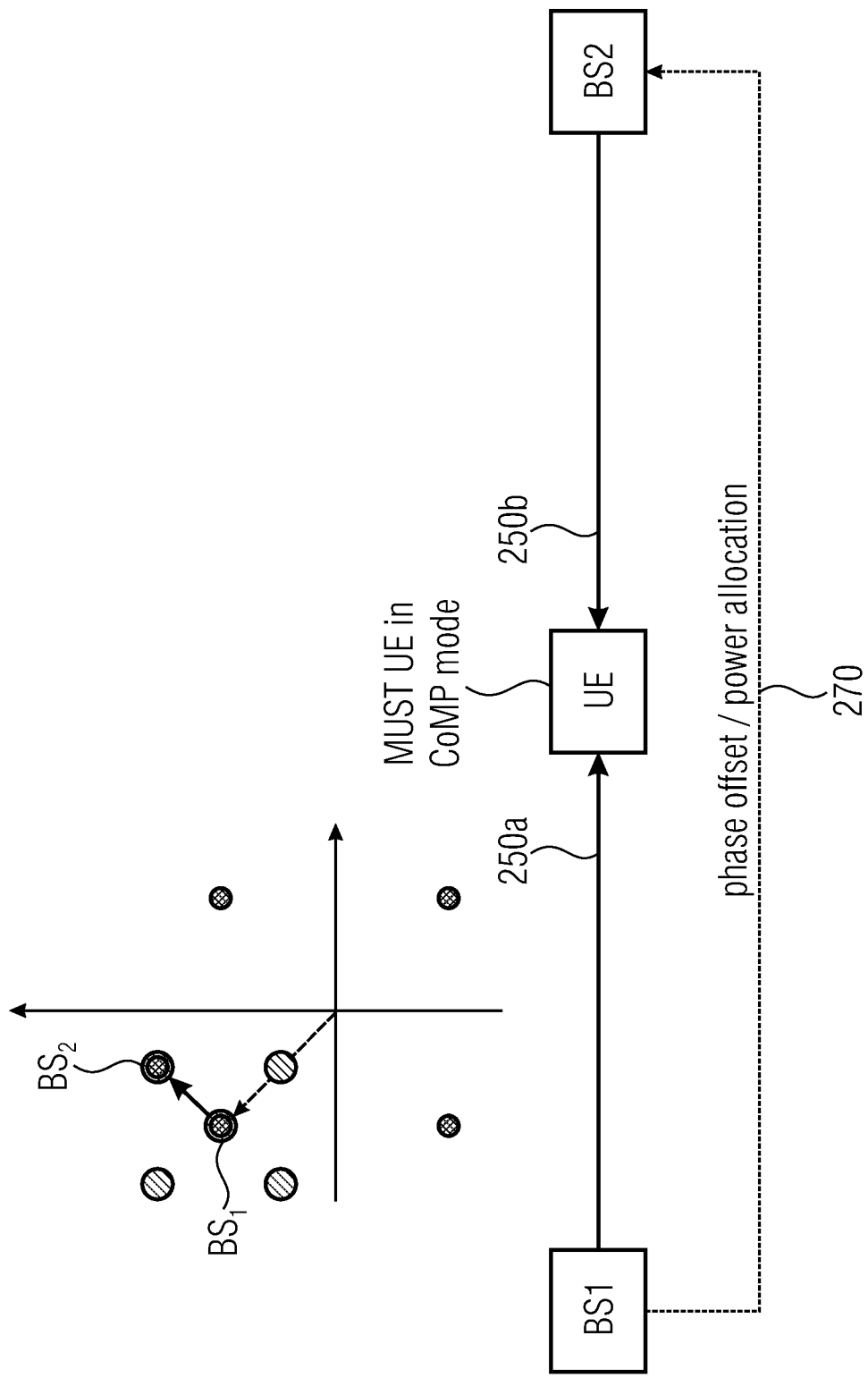

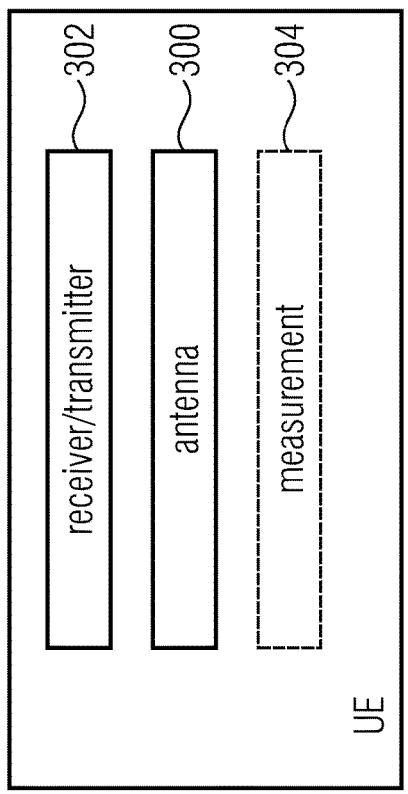
Fig. 12
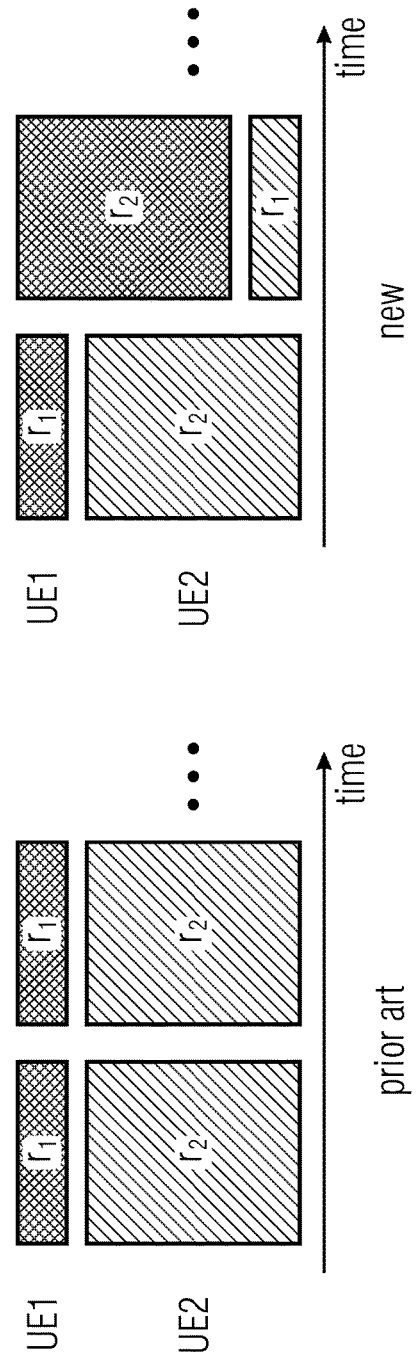
Fig. 13(a) prior art
Fig. 13(b) new

CONCEPTS FOR TRANSMITTING DATA TO ONE OR MORE USERS

CROSS-REFERENCE TO RELATED APPLICATIONS

This application is a continuation of copending International Application No. PCT/EP2018/071806, filed Aug. 10, 2018, which is incorporated herein by reference in its entirety, and additionally claims priority from European Application No. 17185935.8, filed Aug. 11, 2017, which is also incorporated herein by reference in its entirety.

BACKGROUND OF THE INVENTION

The present invention relates to the field of wireless or wired communication networks or systems, more specifically to the concepts for transmitting data to one or more users. Embodiments of the present invention concern the Multi User Superposition Transmission, MUST, of data to one or more users by a plurality of transmitters, like base stations. Other embodiments of the present invention concern the transmission of data to a plurality of users by a transmitter, like a base station, employing Multiple Input Multiple Output, MIMO, techniques.

FIG. 1 is a schematic representation of an example of a wireless network 100 including a core network 102 and a radio access network 104. The radio access network 104 may include a plurality of base stations $eNB_1$ to $eNB_5$, each serving a specific area surrounding the base station schematically represented by respective cells $106_1$ to $106_5$. The base stations are provided to serve users within a cell. A user may be a stationary device or a mobile device. Further, the wireless communication system may be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items having embedded therein electronics, software, sensors, actuators, or the like as well as network connectivity that enable these devices to collect and exchange data across an existing network infrastructure. FIG. 1 shows an exemplary view of only five cells, however, the wireless communication system may include more such cells. FIG. 1 shows two users $UE_1$ and $UE_2$, also referred to as user equipment (UE), that are in cell $106_2$ and that are served by base station $eNB_2$. Another user $UE_3$ is shown in cell $106_4$ which is served by base station $eNB_4$. The arrows $108_1$, $108_2$ and $108_3$ schematically represent uplink/downlink connections for transmitting data from a user $UE_1$, $UE_2$ and $UE_3$ to the base stations $eNB_2$, $eNB_4$ or for transmitting data from the base stations $eNB_2$, $eNB_4$ to the users $UE_1$, $UE_2$, $UE_3$. Further, FIG. 1 shows two IoT devices $110_1$ and $110_2$ in cell $106_4$, which may be stationary or mobile devices. The IoT device $110_1$ accesses the wireless communication system via the base station $eNB_4$ to receive and transmit data as schematically represented by arrow $112_1$. The IoT device $110_2$ accesses the wireless communication system via the user $UE_3$ as is schematically represented by arrow $112_2$. The respective base station $eNB_1$ to $eNB_5$ may be connected to the core network 102, e.g. via the S1 interface, via respective backhaul links $114_1$ to $114_5$, which are schematically represented in FIG. 1 by the arrows pointing to "core". The core network 102 may be connected to one or more external networks. Further, some or all of the respective base station $eNB_1$ to $eNB_5$ may connected, e.g. via the X1 or X2 interface, with each other via respective backhaul links $116_1$ to $116_5$, which are schematically represented in FIG. 1 by the arrows pointing to "eNBs"

The wireless network or communication system depicted in FIG. 1 may by an heterogeneous network having two distinct overlaid networks, a network of macro cells with each macro cell including a macro base station, like base station $eNB_1$ to $eNB_5$, and a network of small cell base stations (not shown in FIG. 1), like femto or pico base stations.

For data transmission a physical resource grid may be used. The physical resource grid may comprise a set of resource elements to which various physical channels and physical signals are mapped. For example, the physical channels may include the physical downlink and uplink shared channels (PDSCH, PUSCH) carrying user specific data, also referred to as downlink and uplink payload data, the physical broadcast channel (PBCH) carrying for example a master information block (MIB) and a system information block (SIB), the physical downlink and uplink control channels (PDCCH, PUCCH) carrying for example the downlink control information (DCI), etc. For the uplink, the physical channels may further include the physical random access channel (PRACH or RACH) used by UEs for accessing the network once a UE synchronized and obtained the MIB and SIB. The physical signals may comprise reference signals (RS), synchronization signals and the like. The resource grid may comprise a frame having a certain duration, like 10 milliseconds, in the time domain and having a given bandwidth in the frequency domain. The frame may have a certain number of subframes of a predefined length, e.g., 2 subframes with a length of 1 millisecond. Each subframe may include two slots of 6 or 7 OFDM symbols depending on the cyclic prefix (CP) length.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the 5G or NR (New Radio) standard.

In the wireless communication network as shown in FIG. 1 the radio access network 104 may be a heterogeneous network including a network of primary cells, each including a primary base station, also referred to as a macro base station. Further, a plurality of secondary base stations, also referred to as small cell base stations, may be provided for each of the macro cells. FIG. 2 is a schematic representation of a cell, like cell $106_1$ in FIG. 1, having two distinct overlaid networks, the networks comprising a macro cell network including the macro cell $106_1$, and a small cell network. Although FIG. 2 represents only a single macro cell, it is noted that one or more of the other cells in FIG. 1 may also use the overlaid networks. The small cell network comprises a plurality of small cell base stations $SeNB_1$ to $SeNB_5$ each operating within a respective area $120_1$ to $120_5$, also referring as the coverage area of the small cell. The small cell base stations $SeNB_1$ to $SeNB_5$ may be controlled by the macro cell base station $MeNB_1$ to which the respective small cell base stations $SeNB_1$ to $SeNB_5$ are connected via respective backhaul links $122_1$ to $122_5$. Rather than connecting the small cell base stations via the backhaul links to the macro cell base station, one or more of the small cell base stations may be coupled to the core network via respective backhaul links. FIG. 2 further shows a user equipment UE being served by the macro cell base station MeNB$_1$ as indicated by arrow 124$_1$ and by the small cell base station SeNB$_1$, as indicated schematically by the arrow 124$_2$.

FIG. 3 is a further schematic representation of a plurality of small cells 120$_1$ to 120$_3$ of a macro cell (not shown). The macro cell may be similar to that in FIG. 2. Each small cell may serve one or more UEs. The respective small cell base stations SeNB$_1$, SeNB$_2$, SeNB$_3$, ..., other than in FIG. 2, are connected via the backhaul links or connections 102$_1$ to 102$_3$ to the core network 102. The respective small cells 102$_1$ to 102$_3$ may be directly connected with each other via the X2 interface, as schematically indicated in FIG. 3. The transport network connecting the respective small cells to the core network 102 may be an optical fiber network including one or more points of presence (PoP) at which a plurality of small cells are connected to the transport network. Further details about a backhaul architecture as shown in FIG. 3 is described in reference [1].

The small cells, also referred to as secondary mobile communication cells, SCs, form an overlay network to the network of macro cells, also referred to as primary mobile communication cells, PC. The small cells may be connected via backhaul links (BL) to the macro cell (FIG. 2) and/or to the core network (FIG. 3). The backhaul links may be wired or wireless links, and in case of connecting the small cells via the backhaul links to the core network, the point of presence (PoP) of the transport network (FIG. 3) may serve as an interface to the core network. Each small cell may serve a number of mobile users UE within its coverage area by means of a wireless access link (AL) 124$_2$. Further, the UEs may be connected to the primary cell, for example to receive control signals, and the connection may be referred to as a control link (CL).

In wireless communication networks as described above with reference to FIG. 1 to FIG. 3, a Multi User Superposition Transmission, MUST, of data may be used. For example, in accordance with LTE, MUST for the downlink (DL) is described in reference [2]. MUST is used as a downlink scheme, namely a multiple access scheme were multiple users are co-scheduled on the same physical resource elements without spatial separation. Such a non-orthogonal transmission allows to improve the multi user (MU) system capacity and/or number of connected devices in the network. The base station (BS) on the transmit side creates composite transmit (TX) constellations for independent data streams. At the receiver side, the data streams may be separated, e.g., by receiver structures using successive interference cancellation. For the downlink (DL) direction the three MUST categories indicated in table 1 below are specified in reference [2]

TABLE 1

Classification of MUST schemes and their key characteristics

| Category | Power Ratio | Gray Mapping | Label-bit assignment |
|---|---|---|---|
| MUST Category 1 | Adaptive, on component constellations | N | On component constellation |
| MUST Category 2 | Adaptive, on component constellations | Y | On the composite constellation |

TABLE 1-continued

Classification of MUST schemes and their key characteristics

| Category | Power Ratio | Gray Mapping | Label-bit assignment |
|---|---|---|---|
| MUST Category 3 | N/A | Y | On the composite constellation |

An example for the transmitter side processing for category 1 is shown in FIG. 4. Data to be transmitted using MUST is provided in a first transport block TB$_1$ and in a second transport block TB$_2$. After independent channel coding, rate matching (RM) and scrambling at 202$_1$, 202$_2$ as well as independent mapping to the modulation symbols at 204$_1$, 204$_2$, the signals carrying the data for a first UE close or near to the transmitter, also referred to as a MUST-near UE, and the data for a second UE far from the transmitter, also referred to as a MUST-far UE (the first UE is closer to the transmitter than the second UE), are weighted at 206 with the amplitude weights $\sqrt{\alpha}$ and $\sqrt{1-\alpha}$, respectively, where $\alpha$ is the transmission power ratio for the MUST-near user, and combined at 208. FIG. 5 shows an example composite constellation of MUST Category 1. The above described DL-MUST is designed for point-to-multipoint transmission, however, it does not support multipoint transmission so that, e.g., there is no possibility to implement a coordinated multi-point transmission of data using MUST.

Further, the above described DL-MUST is implemented to transmit data to MUST-near and MUST-far UEs, also referred to as near and far UEs, i.e., only UEs having a significant SNR-gap or a large SNR difference are selected for the MUST and scheduled jointly on the same resource element(s). Assuming a high SNR near UE (with channel gain $|h_1|^2$) and a low SNR far UE (with channel gain $|h_2|^2$), with $|h_1|>|h_2|$. Thus, with a specific decoding order, the individual rates assuming a SIC receiver may be calculated as:

$$r_2 = B \cdot \log\left(1 + \frac{P_2|h_2|^2}{P_1|h_2|^2 + N}\right) \quad (1)$$

$$r_1 = B \cdot \log\left(1 + \frac{P_1|h_1|^2}{N}\right) \quad (2)$$

The individual rates may be achieved by using a proper channel coding per Non-Orthogonal Multiple Access, NOMA, layer. However, in case the users have similar SNR, i.e., when $|h_1|^2 \cong |h_2|^2$ it follows from (1) and (2) that for a fair power allocation $P_1 \cong P_2$ the individual rates are different, i.e. $r_2 < r_1$ due to the SIC receiver which uses one stream to be decoded first and subtracted from the other. This leads to different SUM rates (=unfair) over time and no gain compared to orthogonal transmission (i.e. OFDMA). Thus, no MUST is applied for users with equal or substantially equal SNRs.

In a wireless communication system like the one depicted schematically in FIG. 1 to FIG. 3, multi-antenna techniques may be used, e.g., in accordance with LTE, to improve user data rates, link reliability, cell coverage and network capacity. To support multi-stream or multi-layer transmissions, linear precoding is used in the physical layer of the communication system. Linear precoding is performed by a precoder matrix which maps layers of data to antenna ports. The precoding may be seen as a generalization of beamforming, which is a technique to spatially direct/focus data transmission towards an intended receiver. Multiple users may be served by a single base station using MIMO techniques, which allow for a spatial precoding so as to serve each user by one dedicated beam. So far it has been assumed that the spatial precoding allows for an "orthogonal" transmission, i.e., interference free transmission, between layers. However, in reality, e.g., due to the limited feedback, the quantized beamformer, etc., there is a cross-layer interference, also referred to as cross-talk, leading to performance degradation. The effect of cross-layer interference mentioned above is now explained in more detail with reference to FIG. 6.

FIG. 6(a) shows a base station BS or gNB, which may also be a small cell base station, using beamforming techniques for providing data to a plurality of users $UE_1$, $UE_2$ using respective transmit beams $B_1$, and $B_2$ which are formed by linear precoding to be directed towards the respective users $UE_1$ and $UE_2$. The respective data or data streams $D_1$, $D_2$ for the users $UE_1$ and $UE_2$ are transmitted on the beams $B_1$, $B_2$. Further, FIG. 6(a) schematically represents the interference due to cross-talk between the respective beams $B_1$ and $B_2$. The interference at the first user $UE_1$ due to the second beam $B_2$ is schematically represented by the dashed line $I_{21}$. Likewise, the interference experienced by $UE_2$ due to beam $B_1$ is represented by the dashed line $I_{12}$. FIG. 6(a) also shows the respective receive constellations at the users $UE_1$ and $UE_2$ indicating how signal carrying only the data $D_1$, $D_2$ and signals only due to the interference $I_{12}$, $I_{21}$ would be received at the respective users $UE_1$, $UE_2$.

FIG. 6(b) represents the effects of the cross-talk interference at the respective users when the base station gNB sends out the data signals using the beams $B_1$, $B_2$ simultaneously. FIG. 6(b) illustrates the transmit constellation at the base station showing that the data $D_1$ for the first user $UE_1$ is represented by a constellation point in the upper left quadrant of the constellation diagram, whereas the data $D_2$ for the second user $UE_2$ is represented by a constellation point in the upper right quadrant of the constellation diagram. What is actually received at the users $UE_1$, $UE_2$ is represented by the receive constellations indicated for the respective users in FIG. 6(b), and depends on interferences $I_{21}$, $I_{12}$ experienced by the respective users $UE_1$, $UE_2$. As can be seen, for the first user $UE_1$, the interference $I_{21}$ from the second beam $B_2$ moves the received signal $R_1$ onto the y-axis of the constellation diagram so that the received signal $R_1$ cannot be decoded at the $UE_1$ correctly, as the $UE_1$ cannot judge whether the received signal $R_1$ should belong to the upper left quadrant or the upper right quadrant of the receive diagram. For $UE_2$, the interference $I_{12}$ from the first beam also causes a shift with regard to the constellation point, however, it is still within the upper right quadrant of the receive constellation which allows the user $UE_2$ to correctly decode in a signal $D_2$. Thus, in a scenario as depicted with reference to FIG. 6 a simultaneous transmission of data by respective beams to a plurality of users from a single base station at the same time may not be possible due to the interference among the respective beams causing at one or more of the users a situation in which the data originally sent cannot be correctly decoded.

SUMMARY

An embodiment may have a base station for a wireless communication network, the wireless communication network including a plurality of base stations, each base station to serve one or more users, wherein one or more users are served by a plurality of base stations to receive a first data signal from the base station and a second data signal from at least one further base station using multi-user superposition transmission, MUST, the base station having: a backhaul interface for a communication with one or more of the plurality of base stations of the wireless communication network, wherein, for transmitting the first data signal to one or more users served by the base station and by the further base station, the base station is configured to negotiate a MUST setting with the further base station via the backhaul interface, and map data of the first data signal using a first transmit constellation set according to the negotiated MUST setting.

Another embodiment may have a user equipment for a wireless communication network, the wireless communication network including a plurality of base stations, each base station to serve one or more user equipments, wherein the user equipment is served by a plurality of base stations to receive a first data signal from a first base station and a second data signal from a second base station using multi-user superposition transmission, MUST, and wherein the user equipment is configured to receive and apply MUST settings for performing demapping on a superposition of the first and second data signals to obtain information data per data signal.

Another embodiment may have a base station for a wireless communication network, the base station to serve two or more users, wherein, a first user is served by the base station to receive a first data signal from the base station and a second user is served by the base station to receive a second data signal from the base station, the base station having: an antenna array for a wireless communication with the two or more users served by the base station, a precoder connected to the antenna array, the precoder causing the antenna array to form a first transmit beam to transmit the first data signal to the first user, and to form a second transmit beam to transmit the second data signal to the second user, wherein, for transmitting the first data signal to the first user, the base station is configured to map data of the first data signal using a first transmit constellation, and for transmitting the second data signal to the second user, the base station is configured to map data of the second data signal using a second transmit constellation, and wherein the precoder is configured to apply a predistortion responsive to an estimated cross-talk between the first and second transmit beams.

Another embodiment may have a user equipment for a wireless communication network, the wireless communication network including one or more base stations, one base station serving two or more user equipments using respective transmit beams, wherein the user equipment receives a first transmit beam and a second transmit beam from the base station and is configured to measure and signal to the base station one or more of a phase offset between the first and second transmit beams, an attenuation on the first and second transmit beams, an interference on the first and second transmit beams, and vectoring parameters for the first and second transmit beams.

According to another embodiment, a wireless communication network may have: a plurality of any one of the above inventive base stations, and a plurality of users and/or a plurality of any one of the above inventive user equipments.

According to another embodiment, a method for transmitting data to one or more users of a wireless communication network, the wireless communication network including a plurality of base stations, each base station to serve one or more users, wherein one or more users are served by a plurality of base stations to receive a first data signal from a first base station and a second data signal from at least a second base station using multi-user superposition transmission, MUST, may have the steps of: negotiating a MUST setting between the first and second base stations via a backhaul interface connecting a plurality of the base stations of the wireless communication network, mapping, according to the negotiated MUST setting, data of the first data signal using a first transmit constellation set by the first base station, and data of the second data signal using a second transmit constellation set, by the second base station, and transmitting the first and second data signals by the first and second base station.

According to still another embodiment, a method for transmitting data to a plurality of users of a wireless communication network, the wireless communication network including a base station serving the plurality of users, wherein a first user is served by the base station to receive a first data signal from the base station and a second user is served by the base station to receive a second data signal from the base station, may have the steps of: controlling an antenna array to form a first transmit beam to transmit the first data signal to the first user, and to form a second transmit beam to transmit the second data signal to the second user, mapping data of the first data signal using a first transmit constellation, and transmitting the first data signal to the first user, and mapping data of the second data signal using a second transmit constellation, and transmitting the second data signal to the second user, wherein, responsive to an estimated cross-talk between the first and second transmit beams, a predistortion is applied upon forming the first and second transmit beams.

Another embodiment may have a non-transitory digital storage medium having stored thereon a computer program for performing a method for transmitting data to one or more users of a wireless communication network, the wireless communication network including a plurality of base stations, each base station to serve one or more users, wherein one or more users are served by a plurality of base stations to receive a first data signal from a first base station and a second data signal from at least a second base station using multi-user superposition transmission, MUST, the method having the steps of: negotiating a MUST setting between the first and second base stations via a backhaul interface connecting a plurality of the base stations of the wireless communication network, mapping, according to the negotiated MUST setting, data of the first data signal using a first transmit constellation set by the first base station, and data of the second data signal using a second transmit constellation set, by the second base station, and transmitting the first and second data signals by the first and second base station, when said computer program is run by a computer.

Still another embodiment may have a non-transitory digital storage medium having stored thereon a computer program for performing a method for transmitting data to a plurality of users of a wireless communication network, the wireless communication network including a base station serving the plurality of users, wherein a first user is served by the base station to receive a first data signal from the base station and a second user is served by the base station to receive a second data signal from the base station, the method having the steps of: controlling an antenna array to form a first transmit beam to transmit the first data signal to the first user, and to form a second transmit beam to transmit the second data signal to the second user, mapping data of the first data signal using a first transmit constellation, and transmitting the first data signal to the first user, and mapping data of the second data signal using a second transmit constellation, and transmitting the second data signal to the second user, wherein, responsive to an estimated cross-talk between the first and second transmit beams, a predistortion is applied upon forming the first and second transmit beams, when said computer program is run by a computer.

Embodiments of the present invention enable a CoMP (Coordinated Multi Point) transmission with a limited amount of feedback using MUST. Further embodiments of the present invention allow applying MUST for users with equal or substantially equal SNRs.

Yet further embodiments of the present invention address the cross-layer interference between MIMO-layers used for transmitting data to a plurality of users.

BRIEF DESCRIPTION OF THE DRAWINGS

Embodiments of the present invention are now described in further detail with reference to the accompanying drawings, in which:

FIG. 6a-b illustrates the simultaneous transmission of data to a plurality of users using respective beams formed at a base station, wherein FIG. 6(a) represents data signals and interference signals produced by the transmission and received at the users, and wherein FIG. 6(b) shows the influence of the interference signals on the signals as received at the users;

FIG. 8a-b is a schematic representation illustrating constellations of superposition data signals, wherein FIG. 8(a) illustrates the constellation resulting from a power allocation at two base stations serving one or more users, and wherein FIG. 8(b) illustrates the constellations of the superposition data signals when, additionally due to the power allocation, also a phase offset compensation at least one of the base stations is applied;

FIG. 10 illustrates an embodiment of the inventive approach in accordance with which one UE is served by two base stations $BS_1$, $BS_2$;

FIG. 11a-b illustrates an embodiment in which two base stations serve different users, of which at least one user is operated in a MUST-UE CoMP mode, wherein FIG. 11(a) illustrates the setup for serving a first user by a first base station and a second user by a second base station, and wherein FIG. 11(b) illustrates rotations of the constellations of data signals as received at a UE owing to a channel phase offset of the channels via which the data signals arrive at the UE;

FIG. 12 is a schematic block diagram of a user in accordance with embodiments of the present invention;

FIG. 13a-b illustrates the data rates over time when applying MUST at users having equal or substantially equal SNR, wherein FIG. 13(a) shows the data rates achievable over time by known approaches, and wherein FIG. 13(b) shows the data rates achievable over time in accordance with embodiments of the present invention;

DETAILED DESCRIPTION OF THE INVENTION

In accordance with the present invention an approach for a downlink communication using MUST to one or more users is provided. This allows for a more efficient use of the resources available for the communication between the base stations and the users and also for an improved data transmission.

The present invention provides a base station for a wireless communication network. The wireless communication network includes a plurality of base stations. Each base station serves one or more users, wherein one or more users are served by a plurality of base stations to receive a first data signal from the base station and a second data signal from at least one further base station using multi-user superposition transmission, MUST. The base station comprises a backhaul interface for a communication with one or more of the plurality of base stations of the wireless communication network, wherein, for transmitting the first data signal to one or more users served by the base station and by the further base station, the base station is configured to negotiate a MUST setting with the further base station via the backhaul interface, and to map data of the first data signal using a first transmit constellation set according to the negotiated MUST setting.

The present invention provides a user equipment for a wireless communication network. The wireless communication network includes a plurality of base stations, each base station to serve one or more user equipments. The user equipment is served by a plurality of base stations to receive a first data signal from a first base station and a second data signal from a second base station using multi-user superposition transmission, MUST. The user equipment is configured to receive and apply MUST settings for performing demapping on a superposition of the first and second data signals to obtain information data per data signal.

In accordance with embodiments, the above described MUST settings negotiated among the BSs may include or indicate the physical resources allocated to the one or more users for transmitting the first and second data signals, and a power allocation for the one or more users. In accordance with further embodiments, also information about the constellation maps used by the base stations may be indicated, the constellation map representing a complex representation of the binary data, e.g., the bit to QAM mapping. When indicating both the allocated power and the constellation map, this may be referred to as a MUST layer. The information about the constellation maps may include information about a phase offset between the constellation maps. For example, a constellation map may contain the power allocation, and the length of a complex vector in the constellation map may represent the power.

Figure 7:
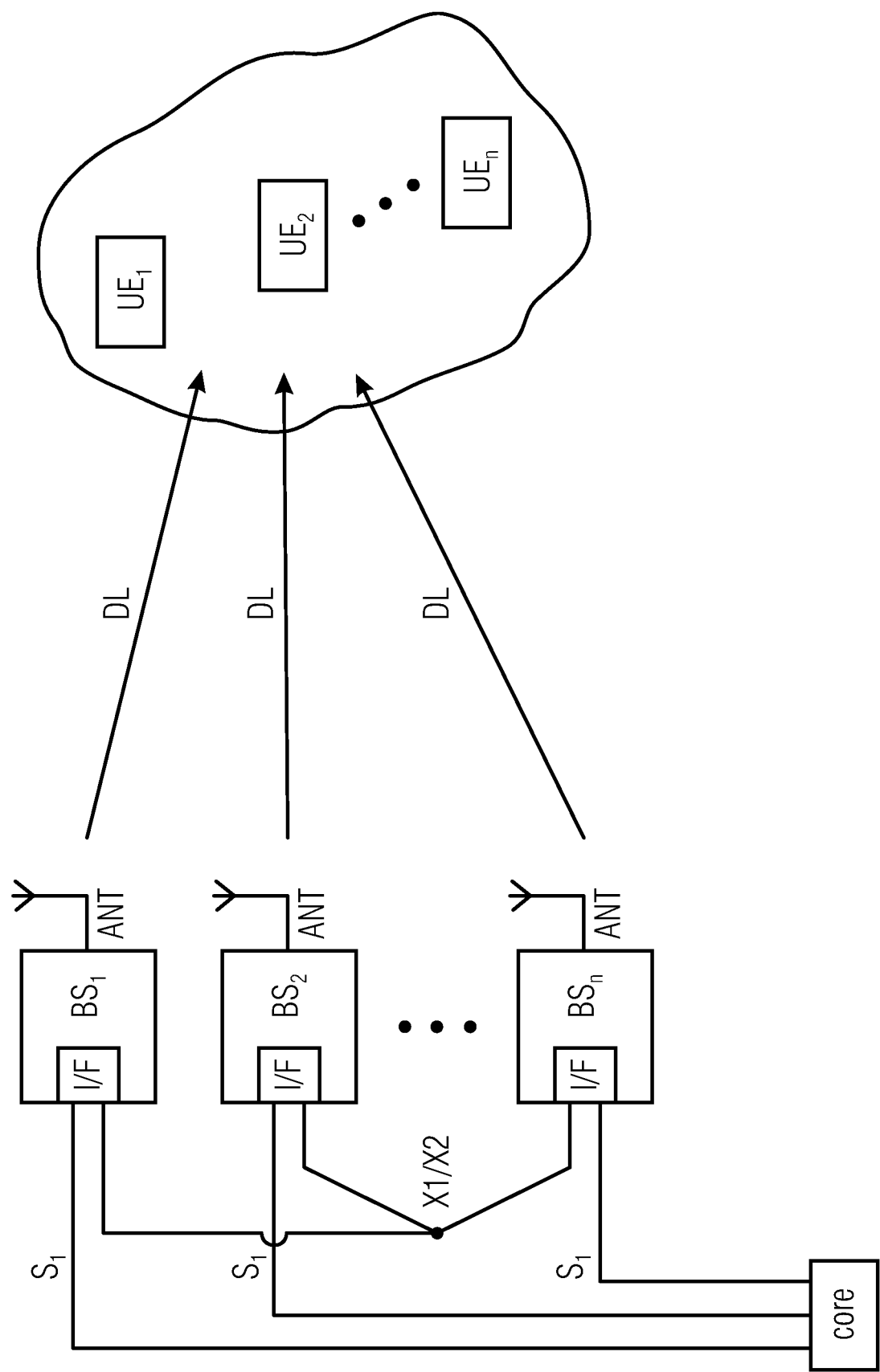
FIG. 7 is a schematic representation of a wireless communication network operating in accordance with the principles described herein.

FIG. 7 is a schematic representation of a wireless communication network operating in accordance with the principles described herein. The wireless communication system may be a communication system as described with reference to one of FIG. 1 to FIG. 3, or it may include a combination of the above-described networks. FIG. 7 shows a plurality of base stations $BS_1$ to $BS_n$ each including an interface I/F for connection to a backhaul of the network, which may be a backhaul connection via the core of the network, for example via the $S_1$ interface, and/or a direct connection of the respective base stations, for example via the $X_1/X_2$ interface. Each of the base stations may comprise an antenna ANT for a wireless communication within the network and in accordance with the inventive approach, a downlink communication is provided to a plurality of users $UE_1$ to $UE_n$. In accordance with the present invention, a transmission of data using MUST to one or more of the users $UE_1$ to $UE_n$ is provided using a plurality of coordinated base stations. For example, two or more of the base stations $BS_1$ to $BS_n$ may be used for a downlink communication to $UE_1$ or to a plurality of users selected from $UE_1$ to $UE_n$ for the downlink communication of data using MUST. For example, individual MUST layers, also referred to as near/far MUST layers may be transmitted by a coordinated set of base stations $BS_1$ to $BS_n$ to a coordinated set of users $UE_1$ to $UE_n$, which also includes the transmission of the data from a plurality of base stations to only one user. To allow for the serving of one or more users by at least two base stations using MUST, the inventive approach coordinates the involved base stations via the backhaul connections of the base stations. For example, when considering the transmission of individual MUST layers by base stations $BS_1$ and $BS_2$ to user $UE_1$ or to users $UE_1$ and $UE_2$, the base stations $BS_1$ and $BS_2$, via the backhaul interfaces I/F negotiate the MUST setting(s) among each other so that each of the base stations can map the respective data signals to be sent via the downlink towards the user(s) using a respective transmit constellation which is set according to the negotiated MUST setting.

The MUST setting, in accordance with embodiments, indicates for example the physical resources allocated to the one or more users, for example the resource blocks or resource elements where the UEs are scheduled. In accordance with further embodiments, information about the power allocation for the one or more users may be included in the MUST setting and/or information about the constellation maps to be used by the base stations. A constellation map represents a complex representation of the binary data, for example the bit—to QAM mapping together with the power allocation. One or more of the above parameters may be included in the MUST settings negotiated among the base station involved in the downlink MUST communication with the one or more users. In accordance with other embodiments, in addition, a phase offset between the respective constellation maps may be included in the MUST setting, for example in cases where the distances between the base stations and the users is different resulting in a substantial phase offset between the channels from the respective base stations to the respective users, or in scenarios, in which a phase offset may be caused by other means.

FIG. 8 is a schematic representation illustrating constellations of superposition data signals.

FIG. 8(*a*) illustrates the effect of a power allocation control at first and second base stations $BS_1$, $BS_2$ of which the second base station transmits its data using MUST. In the example depicted in FIG. 8(*a*) $BS_1$ mapped its data to be transmitted onto a constellation point CP1 in the upper left quadrant as shown by the dotted line arrow, and $BS_2$ mapped its data to be transmitted onto a constellation point CP2 in the upper left hand quadrant as shown by the continuous line arrow. The user may demap the superposition of the received data signals, e.g., by subjecting the mapped superposition (to which the continuous line arrow points) to a successive interference cancellation process. FIG. 8(*a*) further illustrates a rotation of a QAM constellation points of the second base station $BS_2$ relative to the constellation points of a QAM constellation of the first base station $BS_1$ in the complex domain. The rotation may result from a phase offset between a first channel from the first base station $BS_1$ to a user and a second channel from the second base station $BS_2$ to a user, e.g., due to an arbitrary difference in the channels. Both base stations are power controlled so that the data signal from $BS_2$ arrives at the user with less power when compared to the data signal from $BS_1$ manifesting itself in the QAM constellation points of $BS_2$ being less spread, or demagnified, relative to the QAM constellation of $BS_1$.

In accordance with embodiments, also a phase offset compensation may be implemented, e.g., to compensate a rotation of QAM constellation points of the second base station $BS_2$ relative to the constellation points of a QAM constellation of the first base station $BS_1$ in the complex domain, e.g., due to an arbitrary difference in the channels. The phase offset compensation may include a signaling among the base stations involved in the MUST DL communication so that at least some of the base stations provide for pre-rotating its QAM constellation. In accordance with other embodiments, one base station may have a fixed phase for its constellation map, and the one or more other base stations may receive phase offset information for pre-rotating its QAM constellation relative to the fixed phase constellation of the one base station. For example, when a first base station has its phase fixed, a second base station may receive from a user served by the second base station a phase offset between the first base station and the second base station, and apply the received phase offset to its constellation map so that the second base station may pre-rotate its constellation relative to the fixed phase constellation of the first base station.

FIG. 8(*b*) shows the an example assuming a fixed phase constellation for $BS_1$ in which a phase offset (represented by the rotation in FIG. 8(*a*)) has been compensated. Both base stations $BS_1$ and $BS_2$ are power controlled as described above. The compensation may be performed by pre-rotating the $BS_2$ QAM constellation appropriately in order to compensate for, or reduce, a phase shift which the data signals from $BS_1$, $BS_2$ experience on their way to the user(s). As can be seen from FIG. 8(*b*), the constellation points of $BS_2$ are now registered to the axes of the complex domain just as the constellation points of the constellation of $BS_1$. In this example, in which both constellations of $BS_1$ and $BS_2$ are of the same type, namely QAM, the constellation points of $BS_2$ may be transformed onto the constellation points of $BS_1$ by a translatory shift and isotropic scaling in the complex domain exclusively, i.e. no rotation is necessary.

For compensating the phase shift, e.g., in a way as explained above, the phase offset needs to be determined. The phase shift, in accordance with embodiments, may be determined in a way as described in FIG. 9, which shows the users $UE_1$, $UE_2$ and the base stations $BS_1$, $BS_2$. For the subsequent discussion, it is assumed that both base station $BS_1$, $BS_2$ transmit data to the $UE_1$ using MUST, however, in accordance with other embodiments (as depicted by the dotted line arrows), first data may be transmitted from base station $BS_1$ to $UE_1$ and second data may be transmitted using MUST from base station $BS_2$ to $UE_2$. In the following, details of $BS_1$ are described, and, dependent on the circumstances, $BS_2$ may or may not have the same structure.

Figure 9:
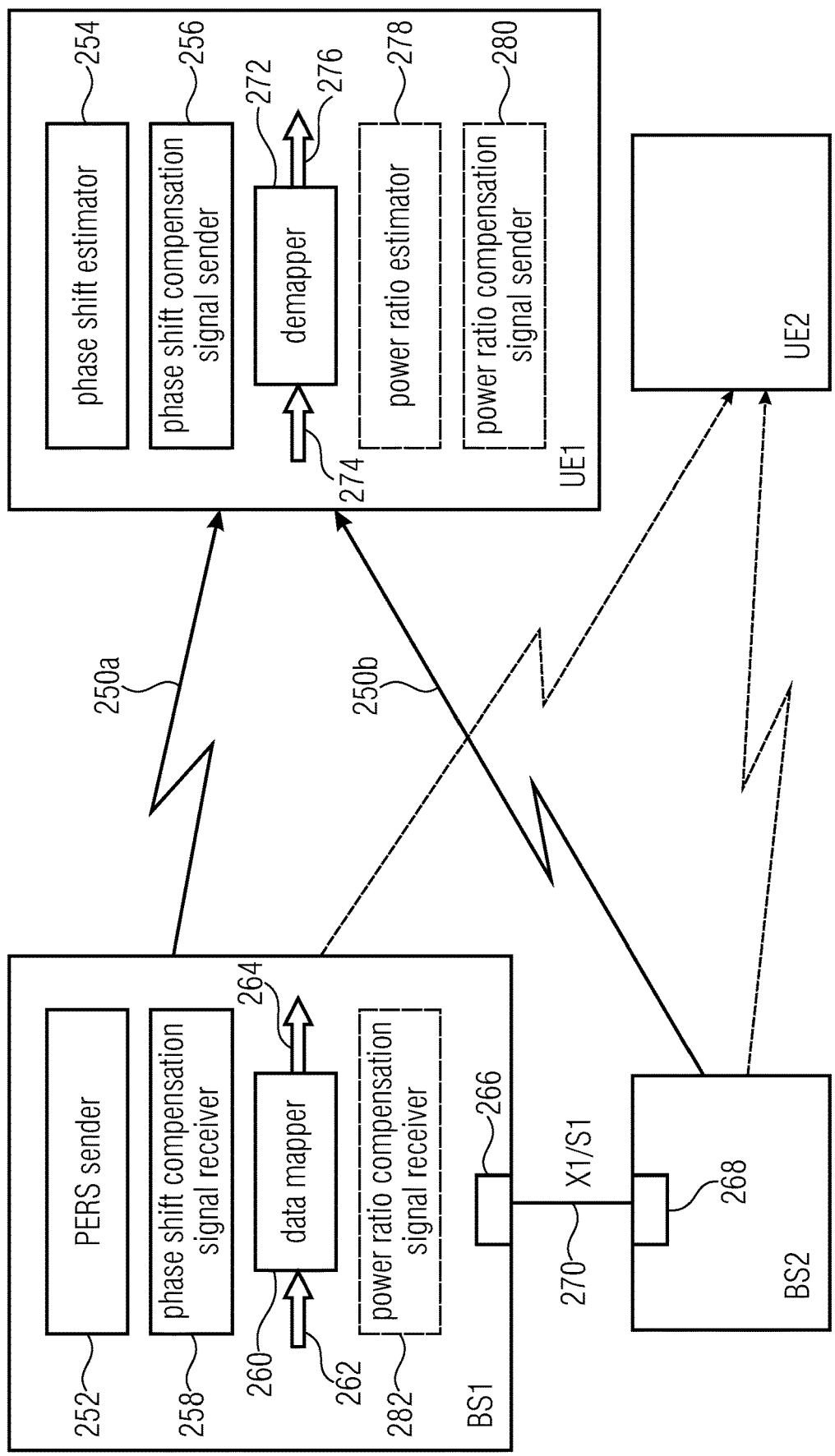
FIG. 9 is a block diagram of users and base stations in accordance with an embodiment of the present application for transmitting, in a superpositioned manner, a data signal to a user.

$UE_1$ receives data signals transmitted over radio channels 250*a*, 250*b* by $BS_1$ and $BS_2$ using multi-user superposition coding or MUST. $BS_1$ includes a phase shift estimation reference signal (PSERS) sender 252 configured to send a phase shift estimation reference signal to $UE_1$. The phase shift estimation reference signal enables $UE_1$ to estimate a phase shift between the channels 250*a*, 250*b*. In a similar manner, $BS_2$ does the same, i.e. sends a PSERS via its connecting channel 250*b* to $UE_1$. $UE_1$ includes a phase shift estimator 254 for estimating a phase shift between the channels 250*a*, 250*b*. To this end, the phase shift estimator 254 may evaluate the phase shift estimation reference signals received from $BS_1$ and $BS_2$, respectively. $UE_1$ includes a phase shift compensation signal sender 256 which receives from the phase shift estimator 254 the information about the phase shift between the channels 250*a*, 250*b* and sends a phase shift compensation signal to at least one of the base stations $BS_1$, $BS_2$. In FIG. 9 it is assumed that $BS_1$ receives the phase shift compensation signal sent by sender 256. To this end, $BS_1$ includes a phase shift compensation signal receiver 258. The phase shift compensation signal is selected such that the phase shift compensation signal leads to a reduction or compensation of any phase shift between the channels 250*a*, 250*b*. Such a phase shift may result from different distances of $BS_1$ and $BS_2$ from $UE_1$.

$BS_1$ includes a mapper 260 which maps data 262 to be transmitted using a certain constellation in a phase shift compensated manner according to the phase shift compensation signal, thereby obtaining the data signal 264 finally to be sent over channel 250*a* to $UE_1$ in a manner superimposed by a corresponding data signal sent from $BS_2$. For example, the data mapper 260 maps the data 262 to be transmitted onto a certain constellation selected, for instance, on the basis of certain channel conditions such as QPSK, QAM or the like. The data mapper 260 rotates its constellation to account for the phase shift between its channel 250*a* and the channel 250*b* of the multiple-user superposition partner $BS_2$. The obtained data signal 264 is then, for instance, used to form a certain OFDM subcarrier of an OFDM or SC-FDM or OFDMA or SC-FDMA signal finally sent out by $BS_1$ to $UE_1$ so that the mentioned subcarrier coincides with the subcarrier onto which a corresponding mapper of $BS_2$ maps its own data. $BS_1$ and $BS_2$ include respective backhaul interfaces 266, 268, like S1, X1 or X2 interfaces, for communicating with each other via a backhaul link 270, which may be a wired link, like an electrical or optical link, or a wireless link, like a microwave link. In the depicted embodiment, it is assumed that $BS_1$ and $BS_2$ negotiated the MUST settings to the extent that $BS_1$ and $BS_2$ are aware of the common resources, like RBs or REs, and the power allocated for the transmission of data from $BS_1$ to $UE_1$ and from $BS_2$ to $UE_1$. This may be negotiated by a signaling via the backhaul link 270. Also information about the phase offset may be signaled.

$UE_1$ includes a demapper 272 which receives the superpositioned data signal, i.e. the superposition of the data signal on the corresponding OFDM subcarrier, indicated at 274, which points to a certain point in the complex plane, and obtains, by performing the demapping, an information data for each data signal, i.e. data signal 276 sent from $BS_1$ and the corresponding data signal sent from $BS_2$. To this end, the demapper 272 may perform a successive interference cancellation (SIC) so that the demapper 272 obtains the information data for the "stronger" data signal first, i.e. the data signal from the "nearer" transmitter, and then derives the information data for the "farther" transmitter. The demapping may be a hard demapping with the information data being one or more bits, or may be a soft demapping with the information data being values between 0 and 1, both inclusively. The information data 276 thus obtained by the demapper 272 for $BS_1$ and $BS_2$, respectively, may then be subject to further processing such as channel decoding including, for instance, deinterleaving, forward error correction, descrambling, depuncturing or the like, performed separately for each base station $BS_1$ and $BS_2$, respectively. In such scenarios, $BS_1$, $BS_2$ may comprise a corresponding channel coder, interleaver, scrambler, and/or puncturer upstream the data mapper 260, and $UE_1$ may comprise upstream the demapper 272, a decomposer decomposing inbound OFDM, SC-FDM or OFDMA or SC-FDMA symbols into OFDM subcarriers, among which one carries the superpositioned data signal.

In accordance with embodiments, $BS_2$ may not take into account any phase shift compensation when mapping data for the transmission to $UE_1$, e.g., $BS_2$ may use a fixed phase for its constellation map. $BS_2$ may send the phase offset information received from $UE_1$ to $BS_1$ via the backhaul 270 for allowing $BS_1$ to pre-rotate its QAM constellation relative to the fixed phase constellation.

In accordance with further embodiments, $BS_2$ may not comprise a phase shift compensation signal receiver and/or may not take into account any phase shift compensation when mapping data for the transmission to $UE_1$. $BS_2$ may even be agnostic with respect to the fact that transmitter $BS_1$ transmits, in a piggyback manner, a further data signal which is then subject to multi-user superposition decoding at $UE_1$ in the manner described above.

In accordance with yet further embodiments of the present application $UE_1$ may optionally (as indicated by the dotted boxes) include a power ratio estimator 278 configured to estimate a power ratio between the plurality of base stations to obtain a power ratio information. A sender 280 sends a power ratio compensation signal depending on the power ratio information to at least one of $BS_1$ and $BS_2$, which may optionally include a power ratio compensation signal receiver 282. $BS_1$ may set a power at which the data signal 264 is transmitted depending on the power ratio compensation signal. In effect, the power set may affect the whole set of subcarriers which the subcarrier of data signal 264 is part of. That is, the whole OFDM/SC-FDM/OFDMA/SC-FDMA symbol carrying a plurality of OFDM subcarriers including the one onto which data mapper 260 has mapped the data 262, may be subjected to a power setting according to the power ratio compensation signal received. The power ratio compensation signal may be used for reducing a deviation of the power at which the data signals participating in the multi-user superposition coding superimpose each other at $UE_1$ so that the constellation points may be distributed in the complex domain most efficiently.

FIG. 10 illustrates an embodiment of the inventive approach in accordance with which one UE is served by two base stations $BS_1$, $BS_2$. The UE may be referred to as a MUST UE in CoMP mode (coordinated multipoint mode). A multipoint-to-point-transmission is implemented in accordance with which the two base stations $BS_1$ and $BS_2$ transmit individual MUST layers via respective channels 250a and 250b to one user UE. To coordinate the operation of the base stations $BS_1$, $BS_2$, such that the two base stations transmit the data in a way as shown in the constellation diagram in FIG. 10, which corresponds to the one explained above with reference to FIG. 8(b), the base stations negotiate the MUST setting(s), for example the above mentioned resource elements to be used, the power location and/or the phase offset. In the scenario depicted in FIG. 10, the user UE and the base stations $BS_1$, $BS_2$ may be operated in a way as described in detail above with reference to FIG. 9.

The embodiments described above assumed that both base station $BS_1$, $BS_2$ transmit data to the $UE_1$ using MUST, however, in accordance with other embodiments, data may be transmitted from base station $BS_1$ to $UE_1$ and additional data may be transmitted using MUST from base station $BS_2$ to $UE_2$.

Figure 8A:
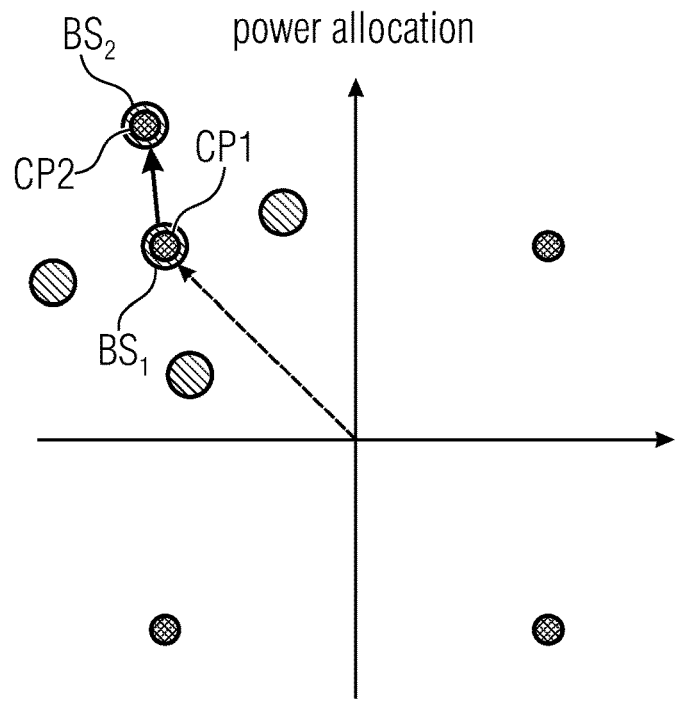
Figure 8B:
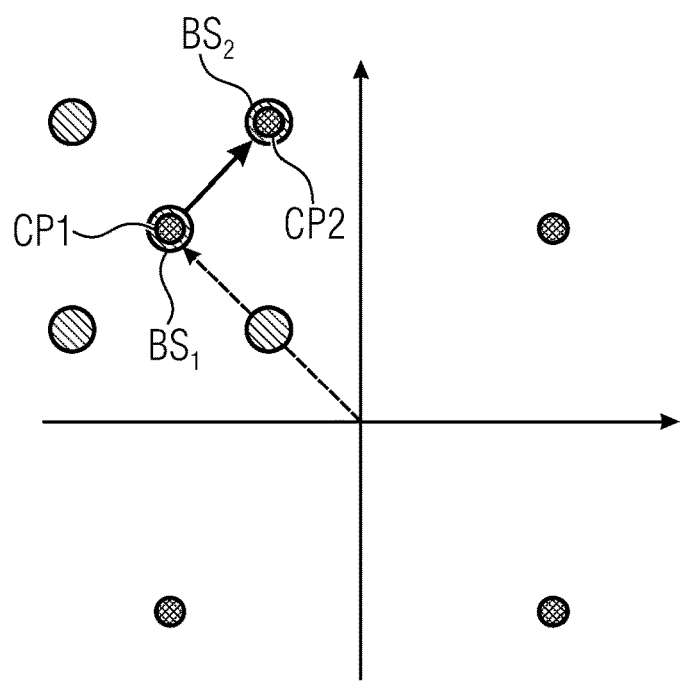
Figure 11A:
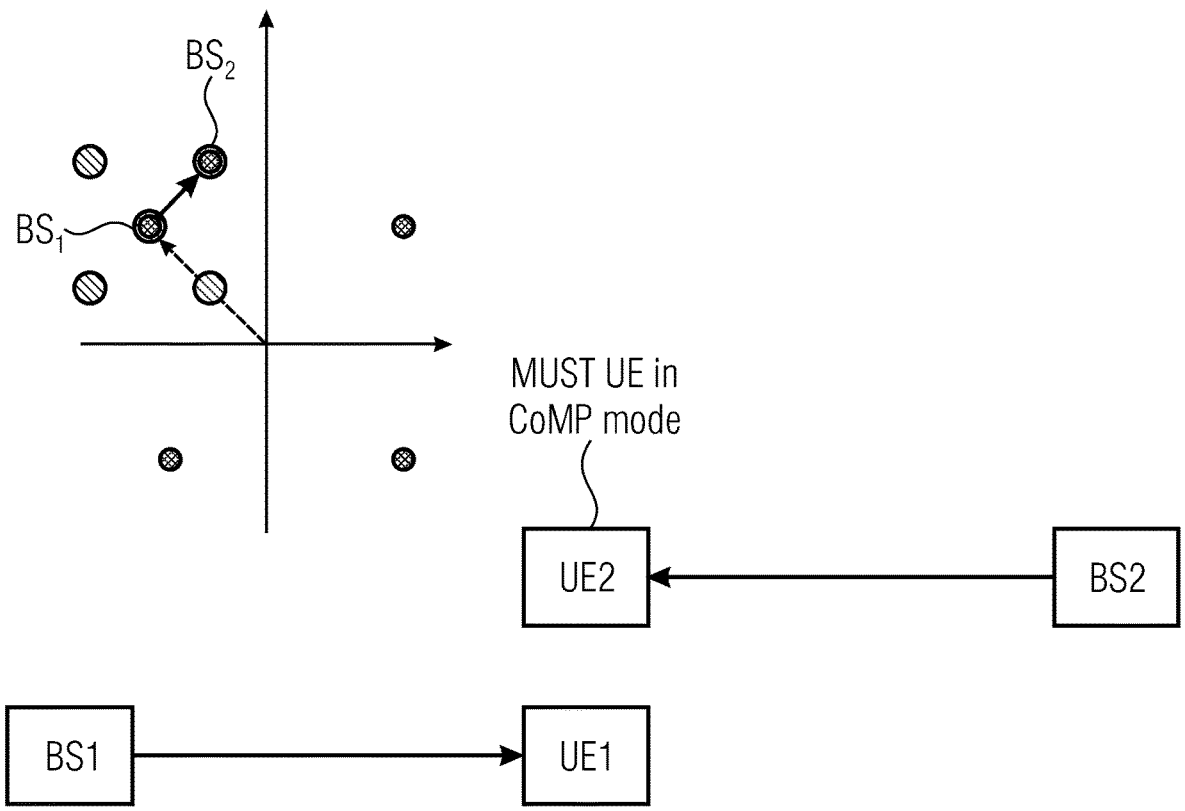
Figure 11B:
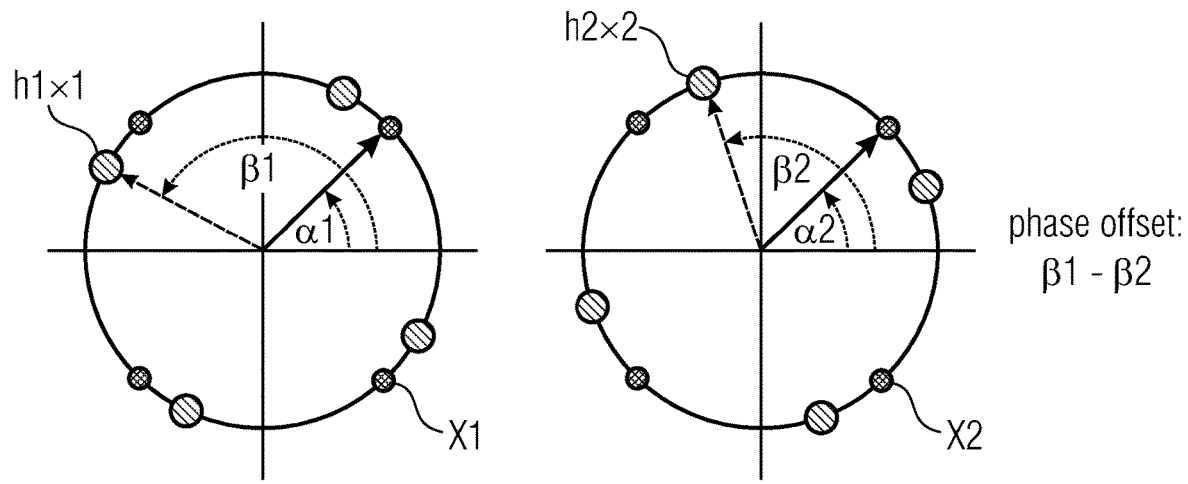

FIG. 11 illustrates such an embodiment, in accordance with which two base stations $BS_1$ and $BS_2$, serve respective users $UE_1$ and $UE_2$ of which user $UE_2$ is operated in the MUST-UE CoMP mode mentioned above. FIG. 11(a) illustrates the setup for serving $UE_1$ by $BS_1$ and for serving $UE_2$ by $BS_2$. In addition, the constellation diagram, similar to the one of FIG. 8(a) is depicted illustrating that $BS_1$ maps its data onto a constellation point in the upper left quadrant as shown by the dotted line arrow, and that $BS_2$ maps its data to be transmitted onto a constellation point also in the upper left-hand quadrant as shown by the continuous line arrow. FIG. 11(b) illustrates rotations of the constellations of data signals as received at a UE or receiver owing to a channel phase offset of the channels via which the data signals arrive at the receiver while illustrating the resulting phase offset shift therebetween, i.e. illustrating the phase offset from $BS_1$ to $BS_2$ as seen at $UE_2$.

More specifically, FIG. 11(b) illustrates how the constellations of inbound component data signals at the $UE_2$ are affected by the channel phase. The data signal, the constellation of which is shown in the left-hand side of FIG. 11(b), arrives by an angle $\beta1-\alpha1$ so that the QAM top right constellation point is at angle $\beta1$, whereas the second data signal's QAM constellation is tilted by angle $\beta2-\alpha2$ so that the top right hand constellation QAM point occurs at $\beta2$, with the phase offset or phase shift relative between both data signals being $\beta1-\beta2$.

The embodiment described above with reference to FIG. 11 may be provided for allowing for an interference coordination when transmitting data from $BS_1$ to $UE_1$ and, using the same resources and the MUST approach for transmitting data from $BS_2$ to $UE_2$. In a similar way as described above with reference to FIG. 7 to FIG. 10, also in the embodiment of FIG. 11 the base stations $BS_1$ and $BS_2$ may be connected via a backhaul connection, like an X1, X2 or S1 interface, for a signaling to allow for interference coordination and management. In accordance with embodiments, resource and power allocations are exchanged, as described above, which allows the respective base stations to adjust their MCS level according to the interference from the MUST layer. For example, a base station may exchange with another base station information about the transmission power on the MUST resources to adjust the MCS level according to an interference from the MUST layer used by the other base station. In accordance with embodiments, the information about the transmission power on the MUST resources may include or contain resource and power allocations. The transmitted information may be an offset or interference estimate from the normal transmit power and not the actual power allocation. Additional signaling from the UEs may be needed, in accordance with yet further embodiments, to assist the network. For example, the received power levels (CSI) representing the attenuation of the paths from the respective UEs to the base stations may be provided to calculate the interference as seen by the UEs. In addition, in accordance with other embodiments the $UE_2$ may send phase offset information, for example information as explained above with FIG. 11(b) to adjust a phase difference between $BS_1$ and $BS_2$. This may be done using an absolute phase difference or iteratively by tracking and adjusting the phase of one base station. The signaling of the $UE_2$ may be via the UCI or RRC to its connected base station $BS_2$. In accordance with other embodiments, this information may be passed on to the base station $BS_1$ from the base station $BS_2$ via the backhaul link. Alternatively, the information may be provided directly from the $UE_2$ to the $BS_1$ via a radio link.

Thus, the embodiment of FIG. 11 may be implemented to improve an inter-cell DL interference situation in which $UE_1$ and $UE_2$ are positioned near to each other and $UE_2$ is in the MUST mode so as to receive a DL signal from $BS_2$ piggy packed onto the signal which $UE_1$ receives on the same physical resource from $BS_1$. $UE_1$ may even be agnostic with respect to this circumstance. Possibly, neither $UE_1$ nor $UE_2$ is in carrier aggregation mode. $BS_2$ may send out the PSERS by its sender 252 and operate as described with reference to FIG. 9 in detail for mapping the data to be send. In accordance with embodiments, $BS_1$ may merely send out a PSERS, but it may not implement the techniques described with reference to FIG. 9 in detail. $UE_2$ may have the special, above described demapping functionality, but is not interested in obtaining the information data for the data signals sent from $BS_1$, but merely uses MUST to separate the information data conveyed by data signals from $BS_2$ from those of $BS_1$. Otherwise, $UE_2$ may have the structure as described above in FIG. 9. $UE_1$ may or may not have the MUST demapping functionality. $UE_2$ receives two PSERS, one from $BS_1$ and another one from $BS_2$. As $UE_2$ is served by $BS_2$, it may signal the phase shift compensation signal to $BS_2$. $BS_2$ may forward to $BS_1$ the phase shift compensation signal it receives from $UE_2$ for controlling the phase shift compensation in data mapping and/or control phase shift compensation in data mapping itself. Similar issues may be performed with respect to power control. Any backhaul or network interconnection, such as the X2 interface, may be used for signal forwarding or information exchange between $BS_1$ and $BS_2$.

FIG. 12 is a schematic block diagram of a user in accordance with embodiments of the present invention. The UE depicted in FIG. 12 may be a user in the wireless communication network as described above with reference to FIG. 1 to FIG. 3, which includes a plurality of base stations, each of which serves one or more users in the wireless communication network. The UE depicted in FIG. 12 may be served by a plurality of base stations to receive, via the antenna 300 and the receiver/transmitter circuit 302, a first data signal from a first base station and a second data signal from a second base station using multi-user superposition transmission. Further, the UE receives, via the antenna 300 and the receiver/transmitter circuit 302, the above mentioned MUST settings for performing the mapping on a superposition of the first and second data signals to obtain information data per data signal.

In accordance with further embodiments, the user equipment may optionally include a measurement circuitry 304 to measure one or more of (i) a phase offset between channels via which the user equipment receives the first and second data signals, (ii) an attenuation on the channels, and (iii) an interference on the channels. The measurement circuitry 304 may include, for example, the phase-shift estimator and the power ratio estimator described above with reference to FIG. 9. Using the receiver/transmitter circuit 302 and the antenna 300 the UE may signal the measurement results to the one or more base stations serving the UE. In accordance with embodiments, the phase-shift compensation signal sender, the power ration compensation sender and the demapper may be part of the receiver/transmitter circuit 302.

Information needed at the user(s), like MUST layer assignment or a swapping pattern (see below) may be signaled to the user(s), for example for a TTI, in a static way using RRC, in a dynamic way using DCI messages in the PDCCH, or by semi-persistent scheduling (SPS).

In the embodiments described above with reference to FIG. 7 to FIG. 11, especially in the examples explained with reference to FIG. 10 and FIG. 11, the distance between the respective UEs from the base stations $BS_1$, $BS_2$ has been shown to be the same. However, in accordance with other embodiments the UE of FIG. 10 may be located closer to $BS_1$ or closer to $BS_2$. In a similar way, in FIG. 11(a), $UE_1$ may be closer to $BS_1$ or closer to $BS_2$ and, likewise $UE_2$ may be closer to $BS_1$ or closer to $BS_2$. In either case, when implementing a data transmission using MUST, the achievable data rates on the links between the base stations and the UE may deteriorate, e.g., when a distances of an UE to the respective base stations is the same leading to equal or substantially equal SNRs for a received. This may occur for a transmission from the base station $BS_1$ to UE and for a transmission from the base station $BS_2$ to the UE in the embodiment of FIG. 10 or for transmitting data from $BS_1$ to $UE_1$ and from $BS_2$ to $UE_2$ in the embodiment of FIG. 11.

To address this problem and to avoid a reduction in the rate of data transmitted over the respective links the layer mapping between two MUST users is alternated, as is illustrated in FIG. 13 illustrating the data rate over time using MUST for users having equal or substantially equal SNR. In FIG. 13(a) the data rate as achievable over time, like over several TTIs or slots, by known approaches are indicated, and it can be seen that the data rates remain low for $UE_1$ while they remain high for $UE_2$. To address this drawback, in accordance with the inventive approach, as depicted in FIG. 13(b), during a first transmission period, the data of a first data signal is mapped by the base station using a first MUST layer having a first transmit constellation and/or a first power allocation, and data of the second data signal is mapped by the further base station using a second MUST layer having a second transmit constellation and/or a second power allocation. This yields the initial rates $r_1$ and $r_2$ that correspond to those achieved in known technology. However, other than in the known technology, in the next transmission period, the second transmission period, the MUST pattern alternates in that now data for the first data signal is mapped by the base station using the second MUST layer, and data of the second data signal is mapped by the other base station using the first MUST layer so that the higher rate $r_2$ is associated with $UE_1$ and the lower rate $r_1$ is associated with $UE_2$.

In other words, as depicted in FIG. 13(b), the data mapping between the two MUST users $UE_1$ and $UE_2$ alternates which provides for a substantially constant sum-rate over time. For example, of the base stations using alternating transmission patterns, one base station modulates the subset of resources, like REs of an RB, in a MUST-near manner, and the complement of the resources are modulated in a MUST-far manner. The other base station uses the complementary modulation pattern. In accordance with embodiments the interleaver at the base stations is designed using this pattern. In accordance with embodiments, the decoding pattern during a MUST transition is indicated to the respective users, for example by signaling a MUST-near-far swapping pattern which indicates the decoding order for each user. For example, this may be received at the UE of FIG. 12 via the antenna and the receiver/transmitter circuit.

Figure 1:
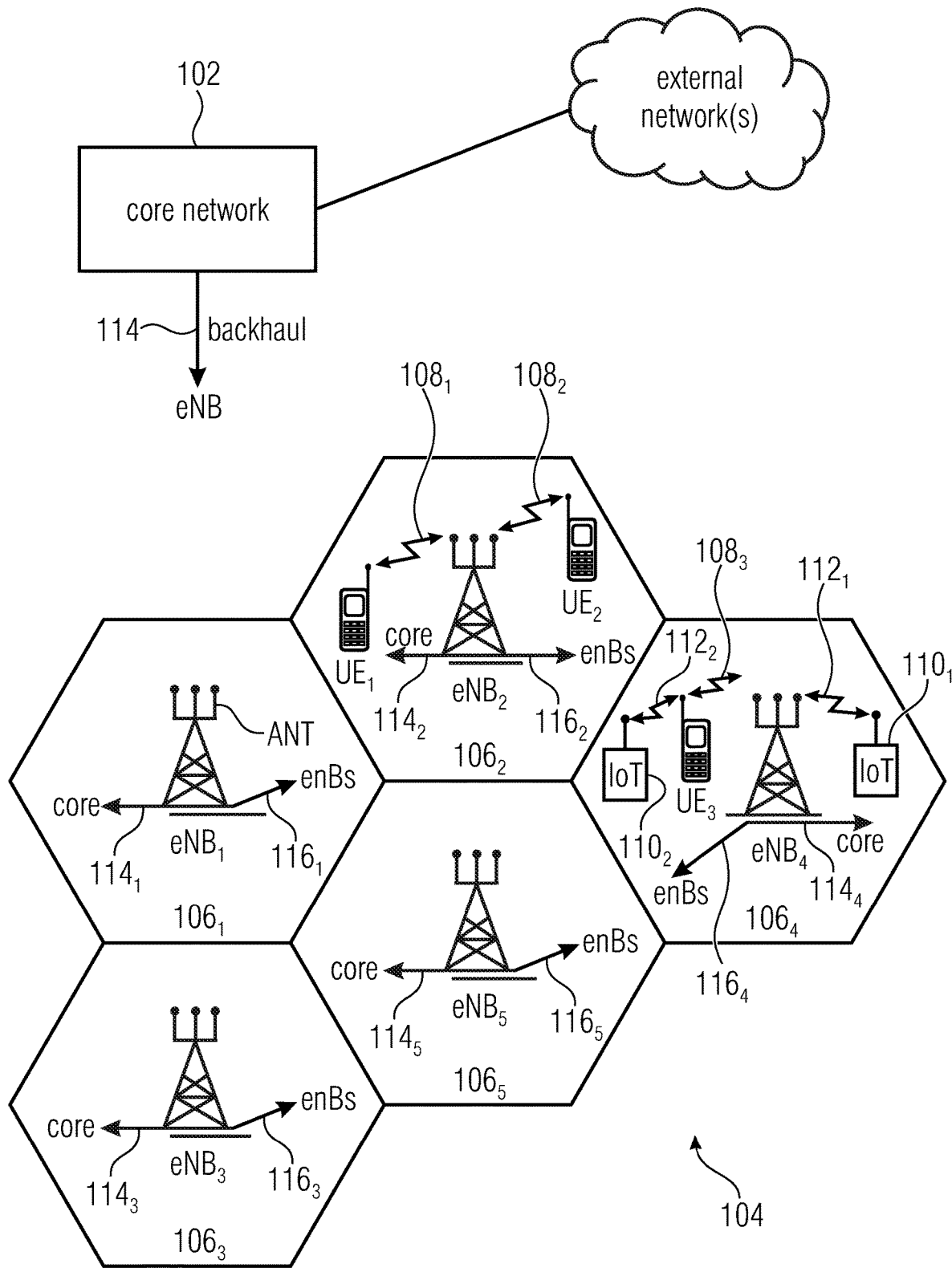
FIG. 1 shows a schematic representation of an example of a wireless communication system.

The above embodiments have been described in the context of base stations and users as they are found in wireless communication networks as depicted in FIG. 1, however, the inventive approach is equally applicable to heterogeneous networks including macrocells and small cells. For example, the approach as described above with reference to FIG. 7 to FIG. 13 may be applied for serving one or more UEs by a macrocell base station and by one or more small cell base stations, like femtocell base stations or pico cell base stations. In such scenarios, in accordance with embodiments, the macrocell base station may have the above mentioned fixed phase for its constellation map and only the small cell base stations adapt their constellation by pre-rotation on the basis of the phase offset information for the phase offset compensation as described above. The macrocell base station may inform the small cell base stations, via the backhaul links, about the MUST setting for one or more users commonly using MUST. In accordance with yet a further embodiment, one or more UEs may be served by one or more macrocell base stations and by one or more small cell base stations.

In the embodiments described above, it has been assumed that the multiple base stations perform a joint MUST encoding, and that the encoding is performed at each of the base stations involved. However, the present invention is not limited to such an approach, rather the joint MUST encoding may also be done in a distributed way. For example, one base station may perform the MUST encoding step and transmit the MUST layer to the one or more base stations involved in the data transmission using MUST via the backhaul connection or a fast interconnect among the base stations. Thus, in accordance with such embodiments the base station may map the second data signal to be provided to the UE using a second transmit constellation which is set in accordance with a negotiated MUST setting. Via the backhaul interface, the mapped data of the second data signal is transmitted to the second base station serving the UE for a wireless transmission of the second data signal using the second transmit constellation to the one or more users which are served by the second base station.

Figure 6A:
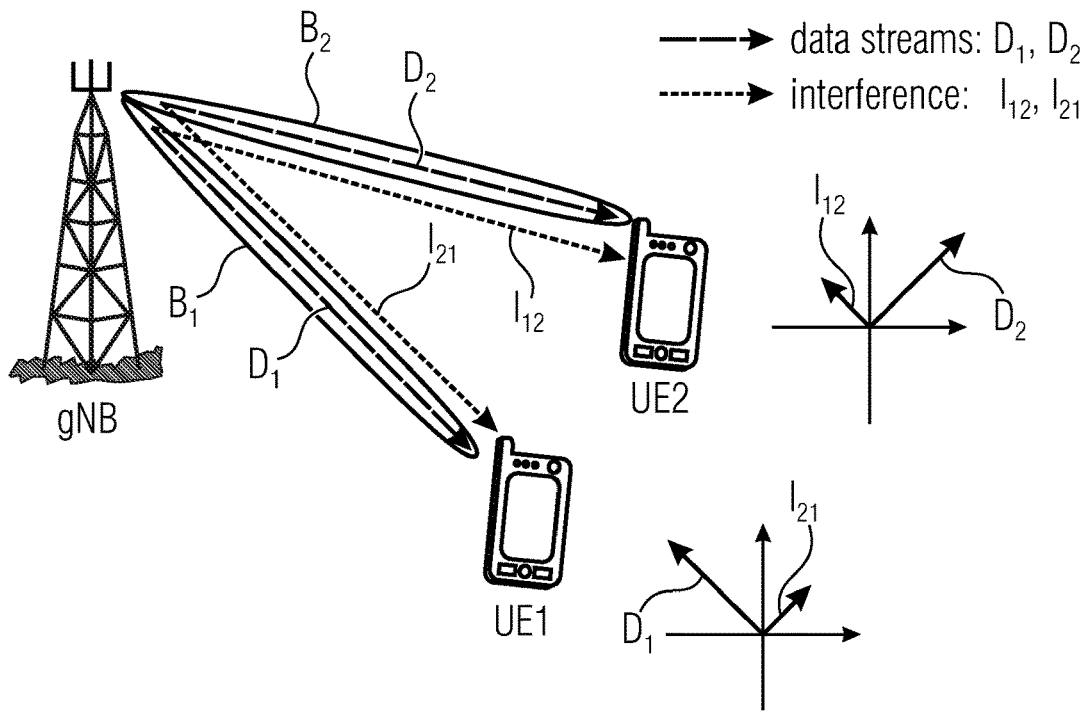
Figure 6B:
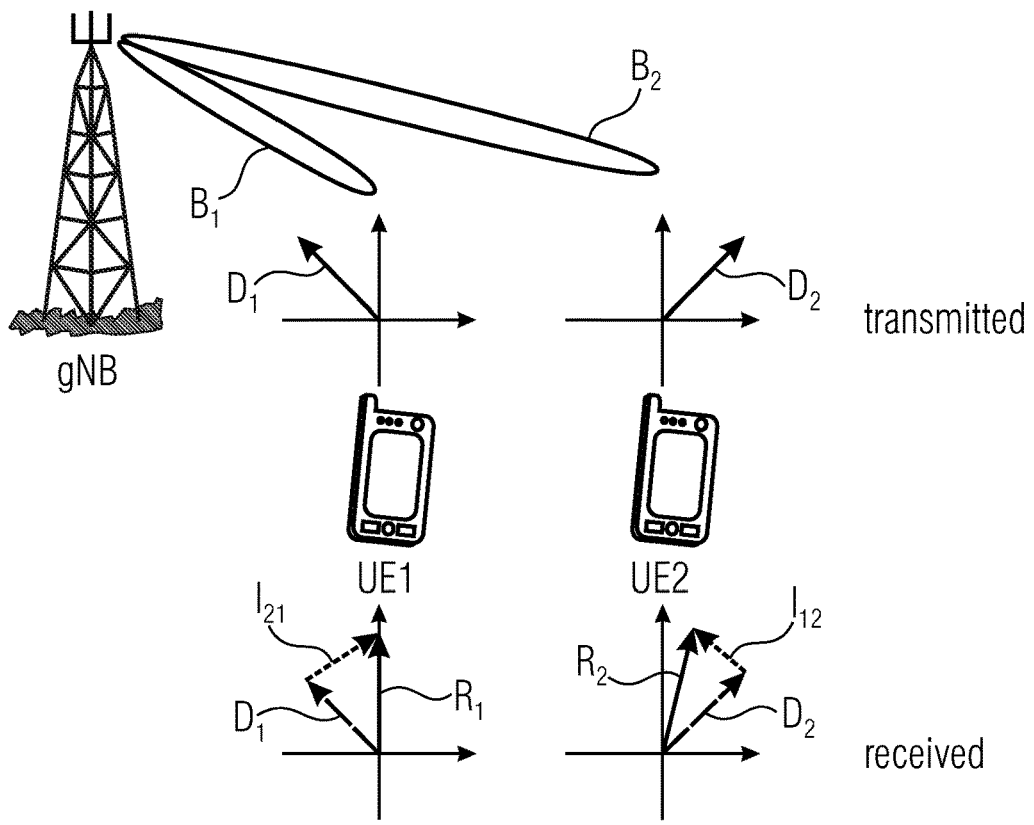

In the following, a further embodiment of the inventive approach addressing the problem of cross-layer interference between MIMO layers will be addressed. As has been described above with reference to FIG. 6, when serving a plurality of users by a single base station via a plurality of beams, the receive signal at the respective users also includes interference components which may result in an overall signal received at the UE that may not be decodable. Such situations may occur due to cross-layer interference or cross-talk between the respective transmit beams formed and transmitted by the base station towards the respective UEs. This may apply in situations, in which the beams are directed towards a position where the UE is assumed to be located, however, in practice, the respective UE is not at the exact position, but may be at a position offset which may increase the problem of cross-talk and the associated performance degradation.

In accordance with embodiments of the present invention, this problem is addressed by exploiting the knowledge of the cross-talk between the MIMO layers, in a similar way as it is done in accordance with vectoring processes. The base station may estimate the cross-talk between the MIMO layers, and since it also knows both transmissions to the users it may estimate the cross-talk impact on the transmission to the others so that the base station may precode the MIMO layers such that the cross-talk is compensated.

Figure 14:
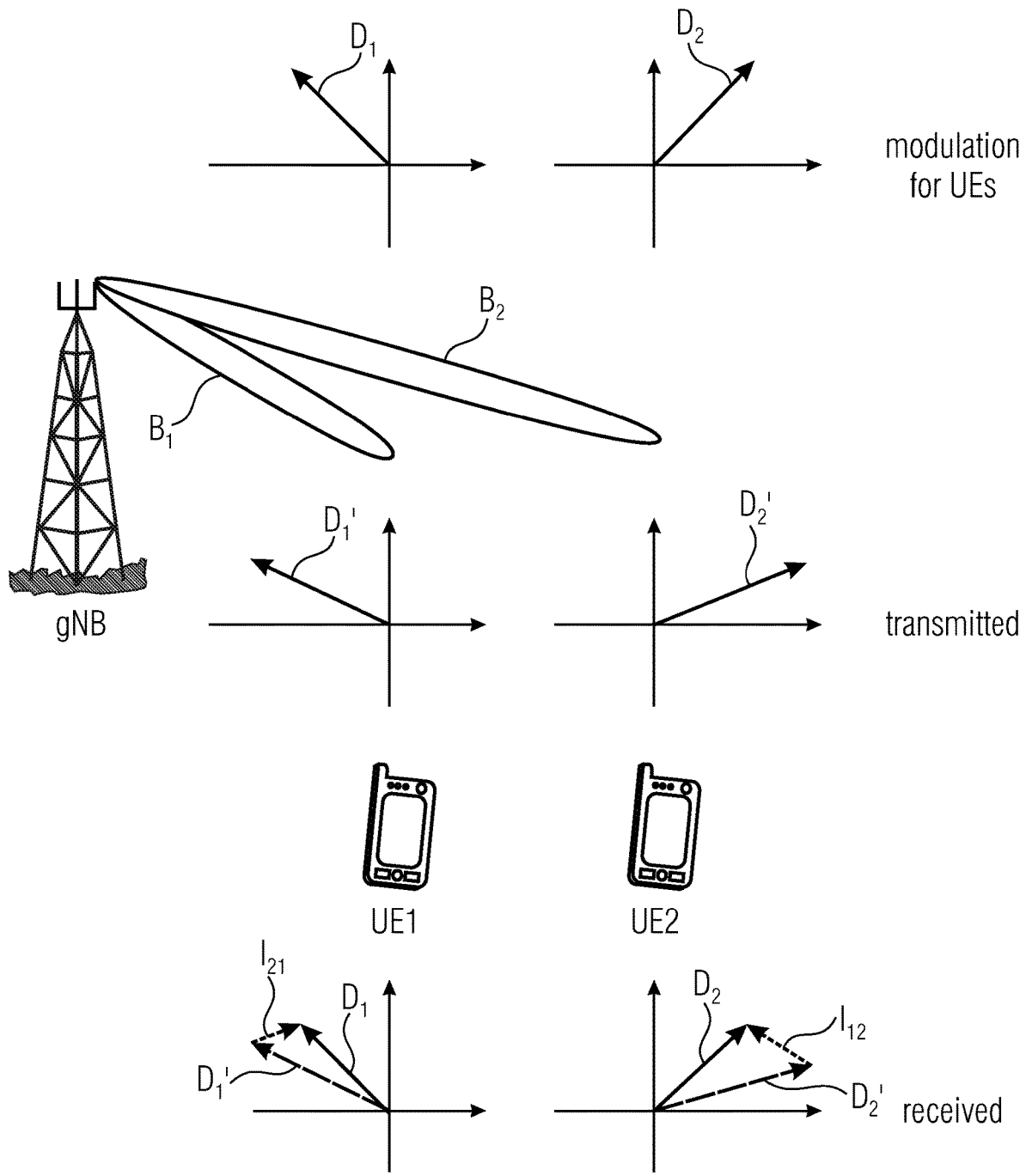
FIG. 14 illustrates the compensation of cross-talk in accordance with an embodiment of an inventive approach.

FIG. 14 illustrates the compensation of cross-talk in accordance with an embodiment of an inventive approach. FIG. 14 shows, like FIG. 6, the base station gNB emitting the beams $B_1$ and $B_2$ for transmitting the first and second data signals $D_1$ and $D_2$. The data signal $D_1$, $D_2$ for the users $UE_1$ and $UE_2$ is mapped, initially, to the desired constellation point which, for $UE_1$ is in the upper left quadrant, and for $UE_2$ is in the upper right quadrant, as shown in the uppermost constellation diagram in FIG. 14. In accordance with the inventive approach, on the basis of the knowledge of the cross-talk or occurring interferences between the beams $B_1$ and $B_2$, the base station gNB performs a predistortion of the signals to be transmitted to the UEs. The signals, which are actual transmitted via the beams $B_1$ to $B_2$, take into consideration the cross-talk or interferences $I_{12}$, $I_{21}$ so that the actually transmitted signals $D_1'$ and $D_2'$ point to different constellation points, as is depicted in the center constellation diagram in FIG. 14. At $UE_1$ and $UE_2$, as is depicted in the lowermost receive constellation diagram in FIG. 14, the predistorted data signal $D_1'$ and $D_2'$ is adjusted back to the desired constellation point due to the interference $I_{21}$ experienced at $UE_1$ and due to the interference $I_{12}$ experienced at $UE_2$, respectively.

Figure 15:
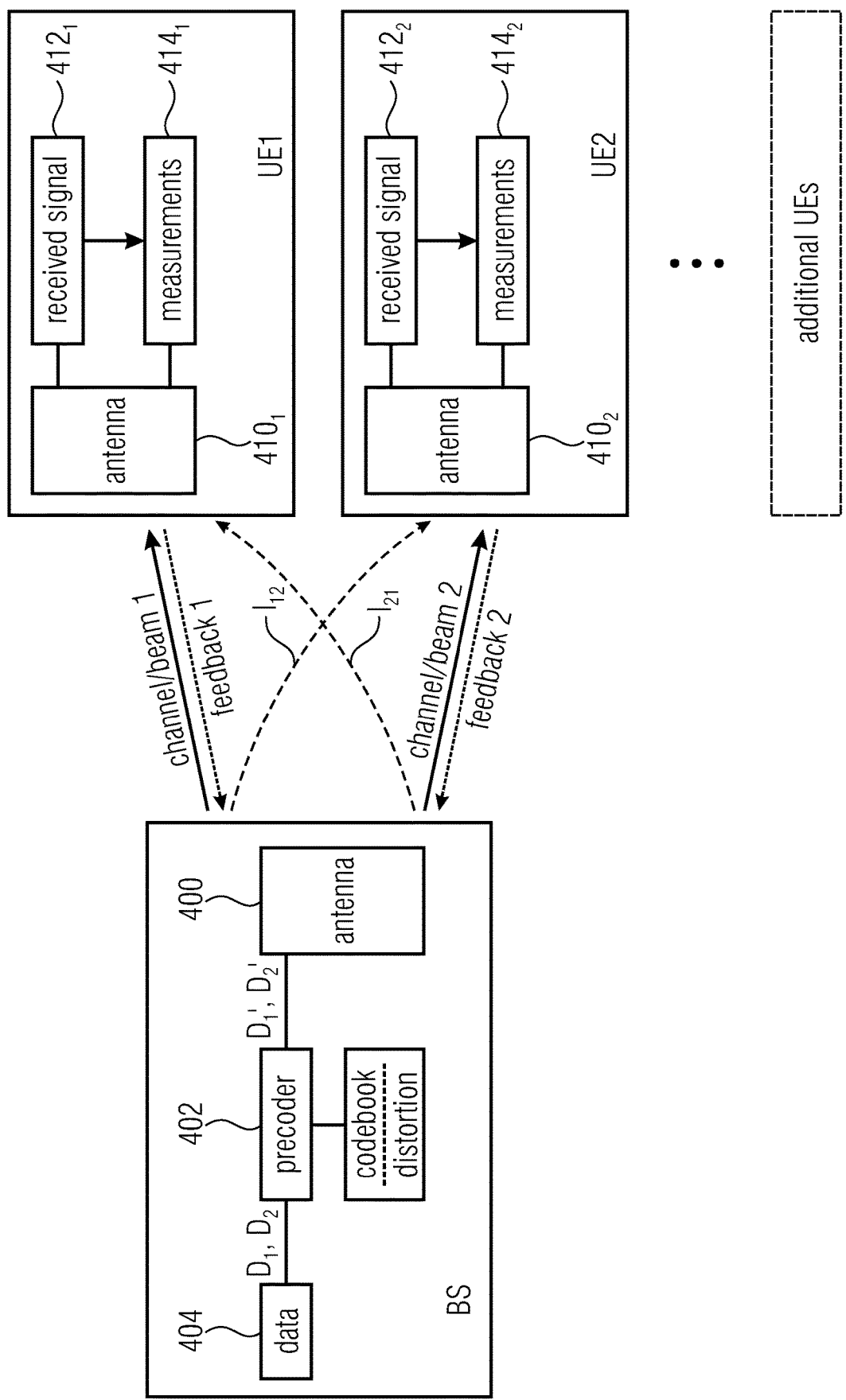
FIG. 15 illustrates a block diagram of a network for implementing the approach described with reference to FIG. 14.

FIG. 15 illustrates a block diagram of a network for implementing the approach described with reference to FIG. 14. FIG. 15 shows a base station BS that may be used in a wireless communication network as described above with reference to FIG. 1 to FIG. 3. The base station BS is to serve the two users $UE_1$ and $UE_2$. In accordance with other embodiments, more than two users may be served, as is indicated in FIG. 15 by the dashed box labeled "additional UEs". A first user $UE_1$ is served by the base station BS to receive the first data signal $D_1$, and the second user $UE_2$ is served by the base station BS to receive the second data signal $D_2$. The base station BS includes an antenna 400, which may include a plurality of antenna elements or an antenna array including plural antenna elements for forming multiple beams $B_1$, $B_2$ for simultaneously transmitting the data $D_1$, $D_2$ to the respective users $UE_1$ and $UE_2$. The antenna 400 allows for a wireless communication to $UE_1$ and to $UE_2$ served by the base station BS. The base station further includes a precoder 402 that is connected to the antenna 400 to cause the antenna 400 to form the first transmit beam $B_1$ to transmit the first data signal $D_1$ to the first user UE, and to form the second transmit beam $B_2$ to transmit the second data signal $D_2$ to the second user. For transmitting the first data signal to the first user, the base station maps the data of the first data signal using a first transmit constellation, and for transmitting the second data signal for the second user, the base station maps the data of the second data signal using a second transmit constellation. The precoder 402, responsive to an estimated cross-talk between the first and second transmit beams $B_1$ and $B_2$, applies a predistortion so that the signals actually transmitted are not the data signals $D_1$, $D_2$ but the predistorted data signals $D_1'$ and $D_2'$ as has been explained above with reference to FIG. 14.

In accordance with embodiments, the base station BS receives data to be transmitted to $UE_1$ and $UE_2$, as is indicated at 404. The data $D_1$, $D_2$ is applied to the precoder 402 which receives from the codebook respective weights for forming the respective beams by the antenna 400 and additional predistortion coefficients for generating the predistorted transmit data signals $D_1'$ and $D_2'$. In accordance with embodiments, the base station receives feedback information via one or more feedback channels from $UE_1$ and from $UE_2$ obtained at the respective users by measurements of the channel, on the basis of which the base station may estimate the cross-talk. In accordance with embodiments, the base station may estimate the cross-talk using measurements received from one or more of the users. The base station may receive information from the users about an attenuation and a phase shift on the channels between the base station and the users. Appropriate distortion coefficient(s) may be selected using the feedback and may be applied together with the codebook coefficient to the precoder for achieving the predistorted signals $D_1'$ and $D_2'$. In accordance with other embodiments, the cross-talk is estimated at the one or more of the users, and the base station may receive the estimate of the cross-talk from one or more of the users.

FIG. 15 also shows how a UE may be implemented for operating in accordance with the embodiment described with reference to FIG. 14 and FIG. 15. Only $UE_1$ will be described in detail, however, the other UEs may have a similar structure. $UE_1$ includes an antenna $410_1$, via which a signal on the respective channel connected to the base station is received, as is indicated at $412_1$. The received signal $412_1$ includes signal components stemming from the signal transmitted via beam $B_1$, as well as signal components stemming from the signal transmitted by beam $B_2$, namely the interference components $I_{21}$. $UE_1$ further includes a measurement circuitry $440_1$ for performing channel estimation, for example on the basis of reference signals sent by the base station on the two channels initially or at specific times during the transmission so as to allow for an estimation of the channel. The reference signals may include the phase estimate reference signals described above with reference to FIG. 9 and the measurement circuitry $414_1$ may have a structure as described above with reference to FIG. 9. On the basis of the signals received from the base station, namely the reference signals, an attenuation of the channels, a channel quality, a phase offset between the channels and an interference among the channels, namely cross-talk, may be determined. The feedback information may be sent to the base station via the antenna $410_1$ so as to allow for the above described predistortion of the data signal. In other words, in accordance with embodiments the UE, by means of the measurement circuitry $414_1$, is in the position to provide vectoring parameters for the first and second transmit beams, on the basis of which the predistortion is performed at the base station for compensating the cross-talk $I_{12}$, $I_{21}$ at the users $UE_1$ and $UE_2$.

In accordance with other embodiments, the measurement circuitry $414_1$ may use a measurement and estimation of a phase shift and an attenuation at the UE to estimate the cross-talk, and the UE transmits the estimate of the cross-talk to the base station, rather than transmitting the complete measurement.

The transmission of the reference signal for estimating the cross-talk on the basis of measurements performed by the UEs which are fed back to the base station may occur prior to starting a transmission of data to the two users and/or may occur periodically during a time period during which data is sent to the UEs.

Figure 2:
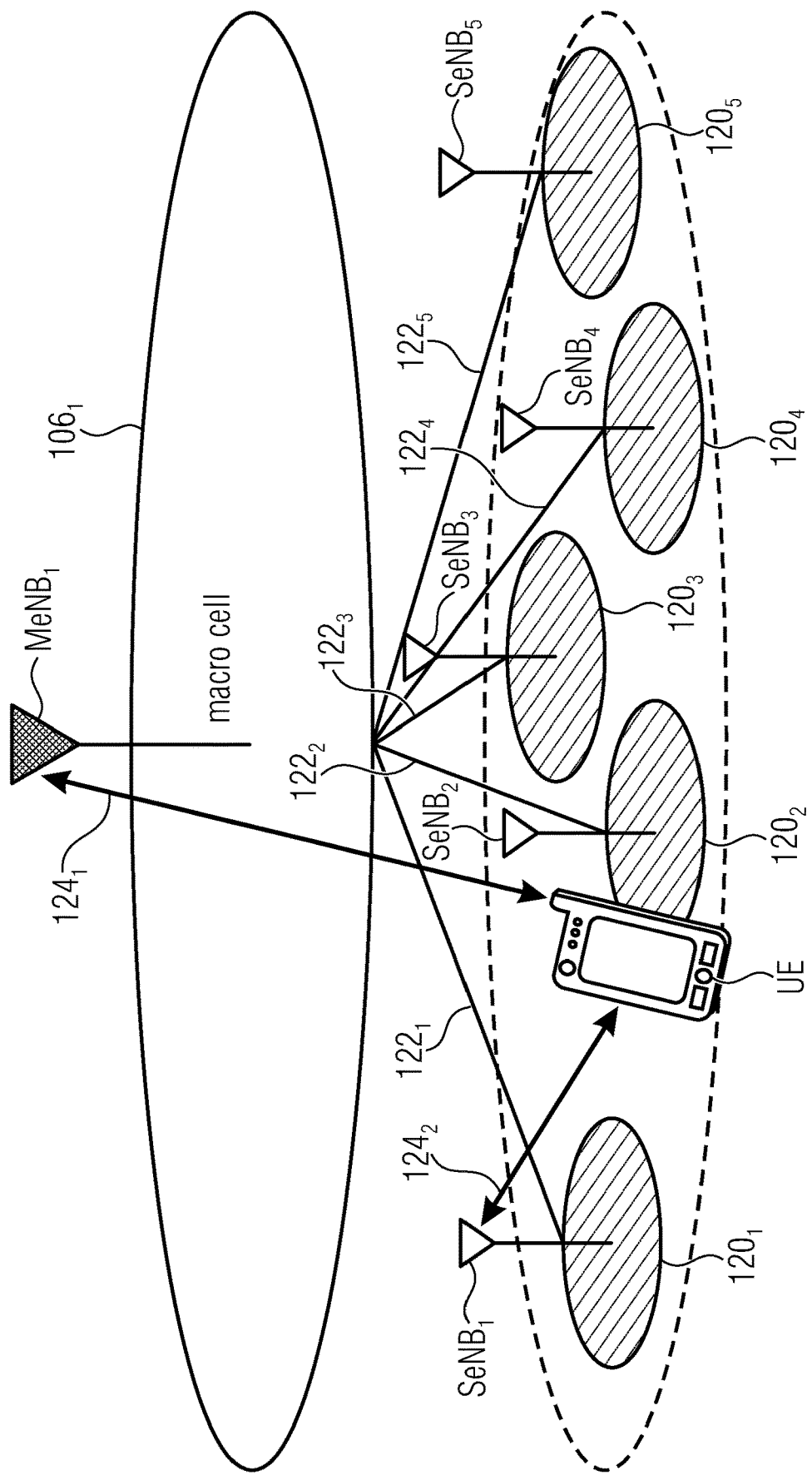
FIG. 2 shows a schematic representation of a cell, like a cell in FIG. 1, having two distinct overlaid networks, namely a macro cell network including a macro cell and a small cell network including small cell base stations connected via backhaul links to the macro cell base station.
Figure 3:
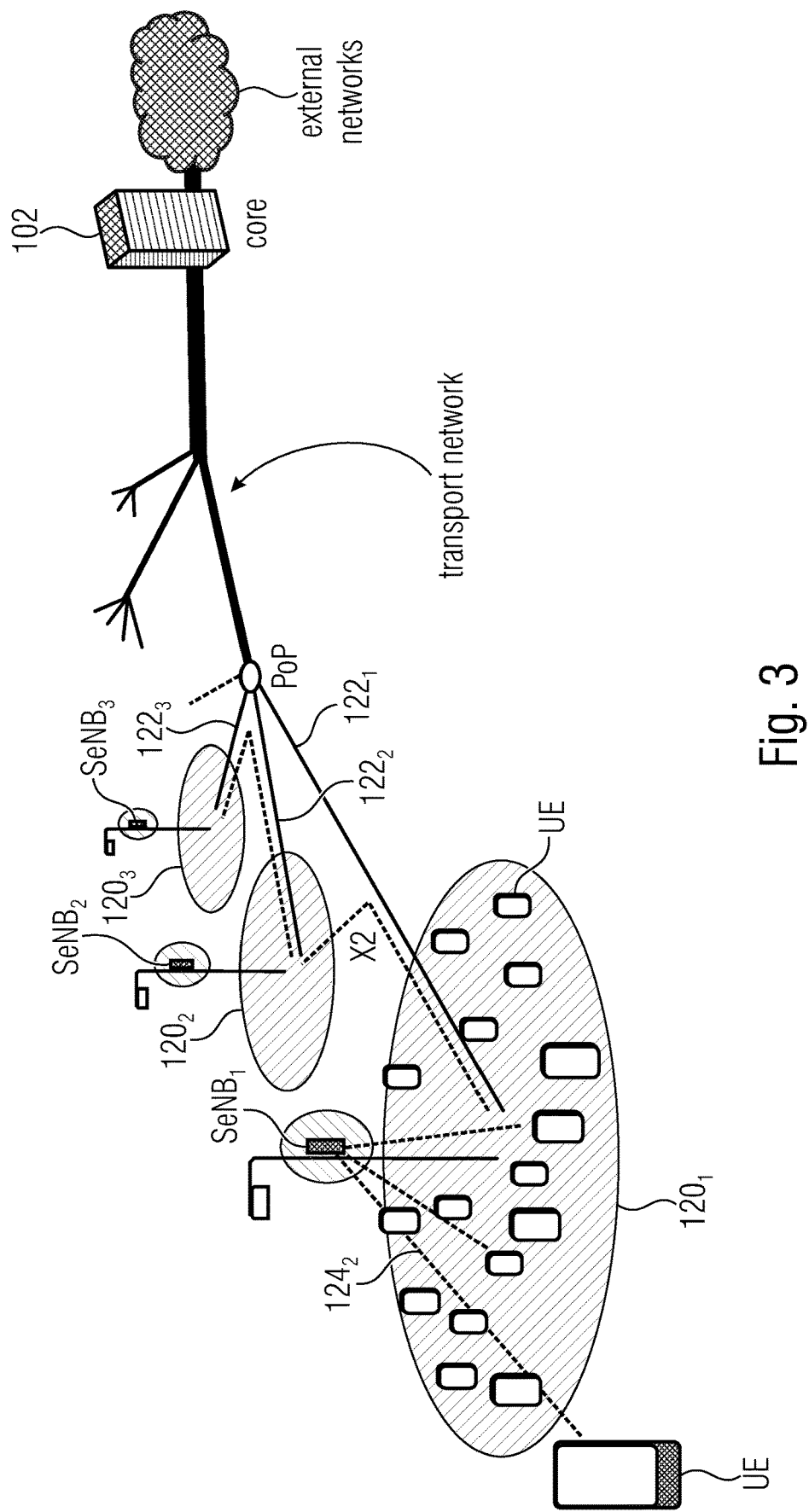
FIG. 3 shows a further schematic representation of a plurality of small cells of a macro cell, similar to FIG. 2, wherein the small cell base stations are connected via backhaul links to each other and to the core network.
Figure 4:
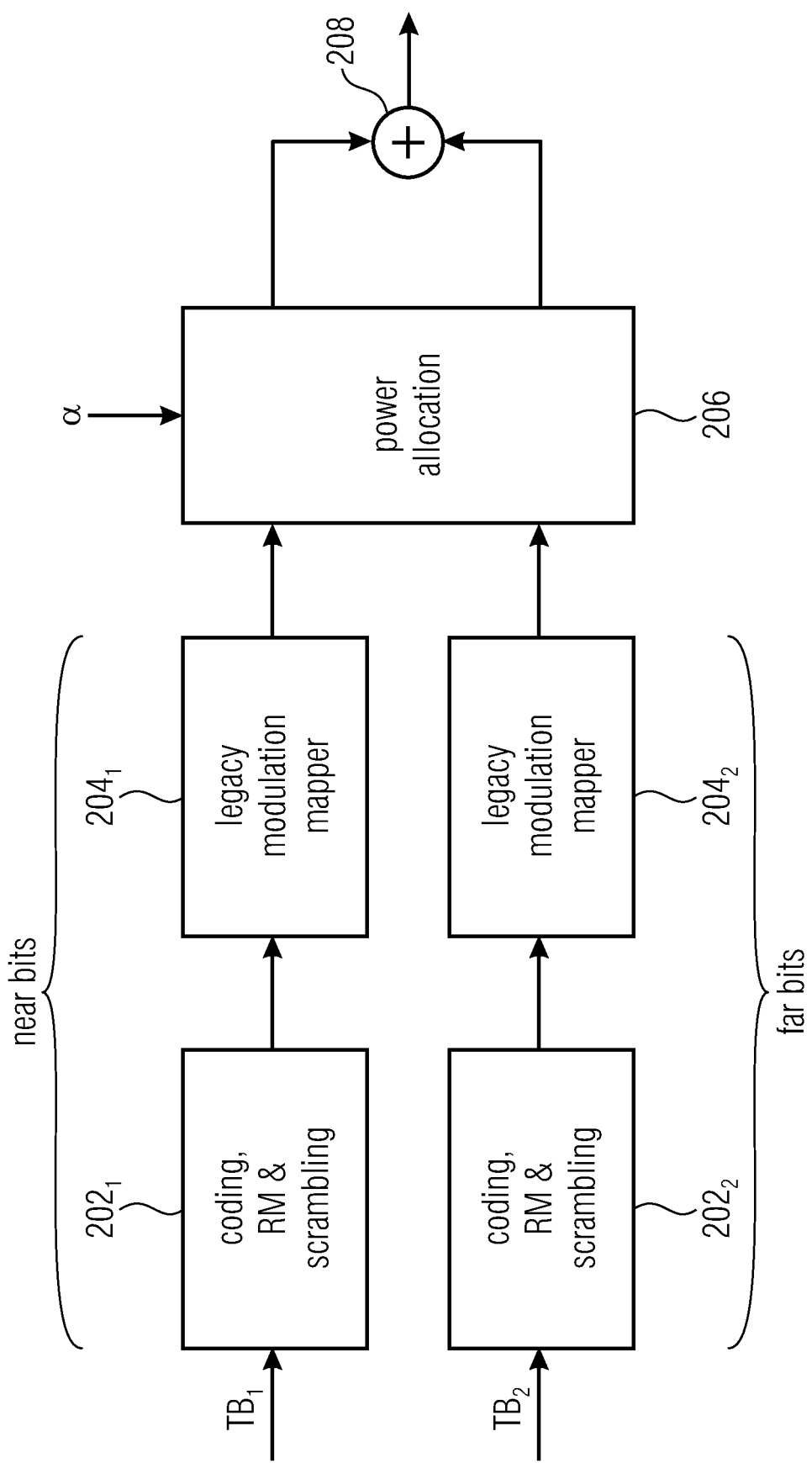
FIG. 4 shows a block diagram of a transmission path of a base station for downlink MUST.
Figure 5:
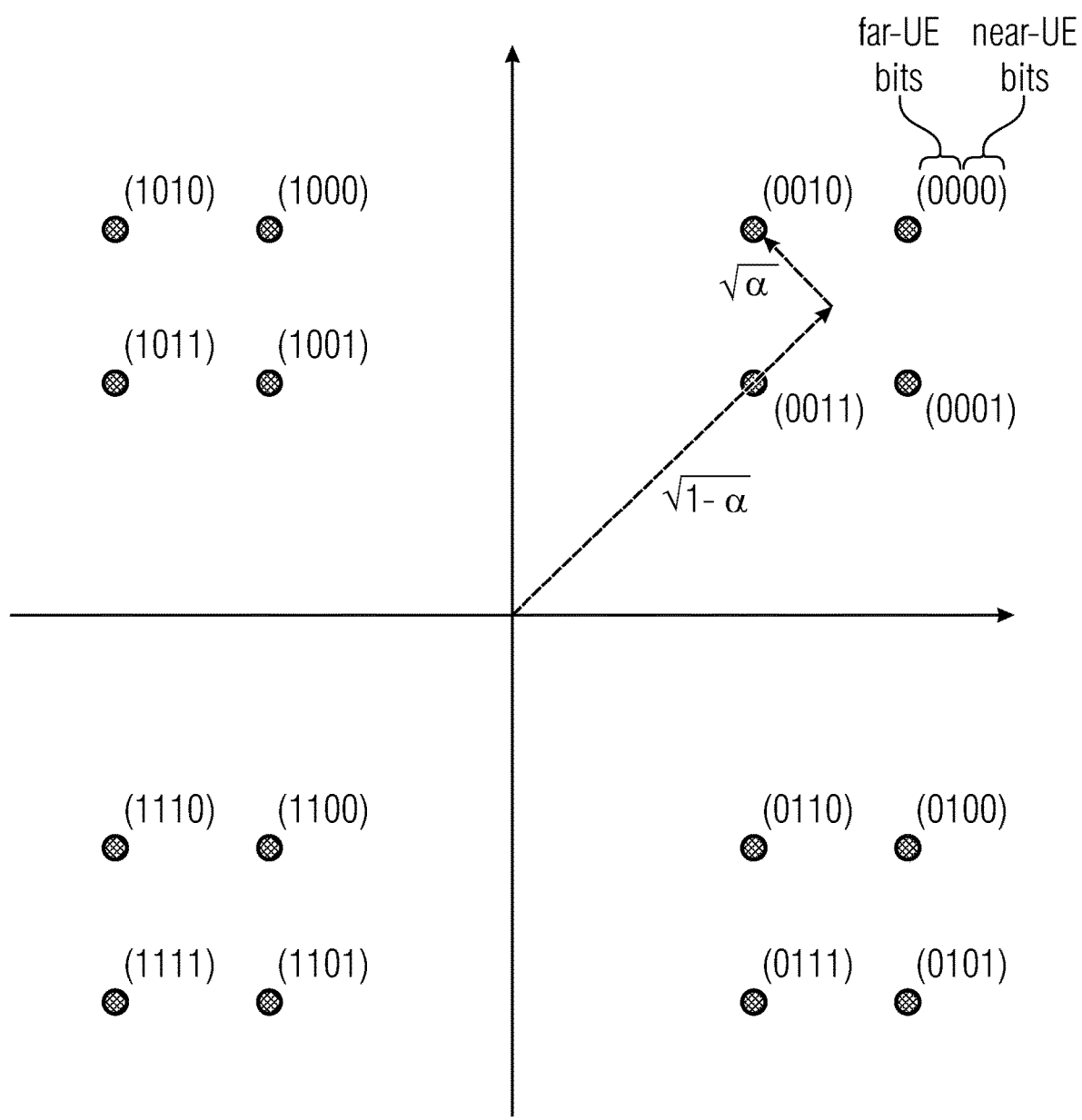
FIG. 5 shows a schematic diagram of a composite constellation of MUST category 1.

In the embodiments described above with reference to FIG. 14 and FIG. 15, reference is made to a base station, like a base station in the wireless communication network of FIG. 1, however, the base station may also be a macro base station as used in the heterogeneous networks of FIG. 2 and FIG. 3 or it may be a small cell base station in such a network. In accordance with the other embodiments, the base station may also be implemented by a user equipment having MIMO capabilities and being served by a macrocell base station or a small base station or both, for example in accordance with the teachings described with reference to FIG. 7 to FIG. 13 of the present application. Such a UE may be used, for example as a relay, for further transmitting data using the two beams simultaneously to further UEs connected to the relay UE via a side link connection. The relay UE may be a mobile phone while the connected UEs may be variable IoT devices, like smartwatches.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 16:
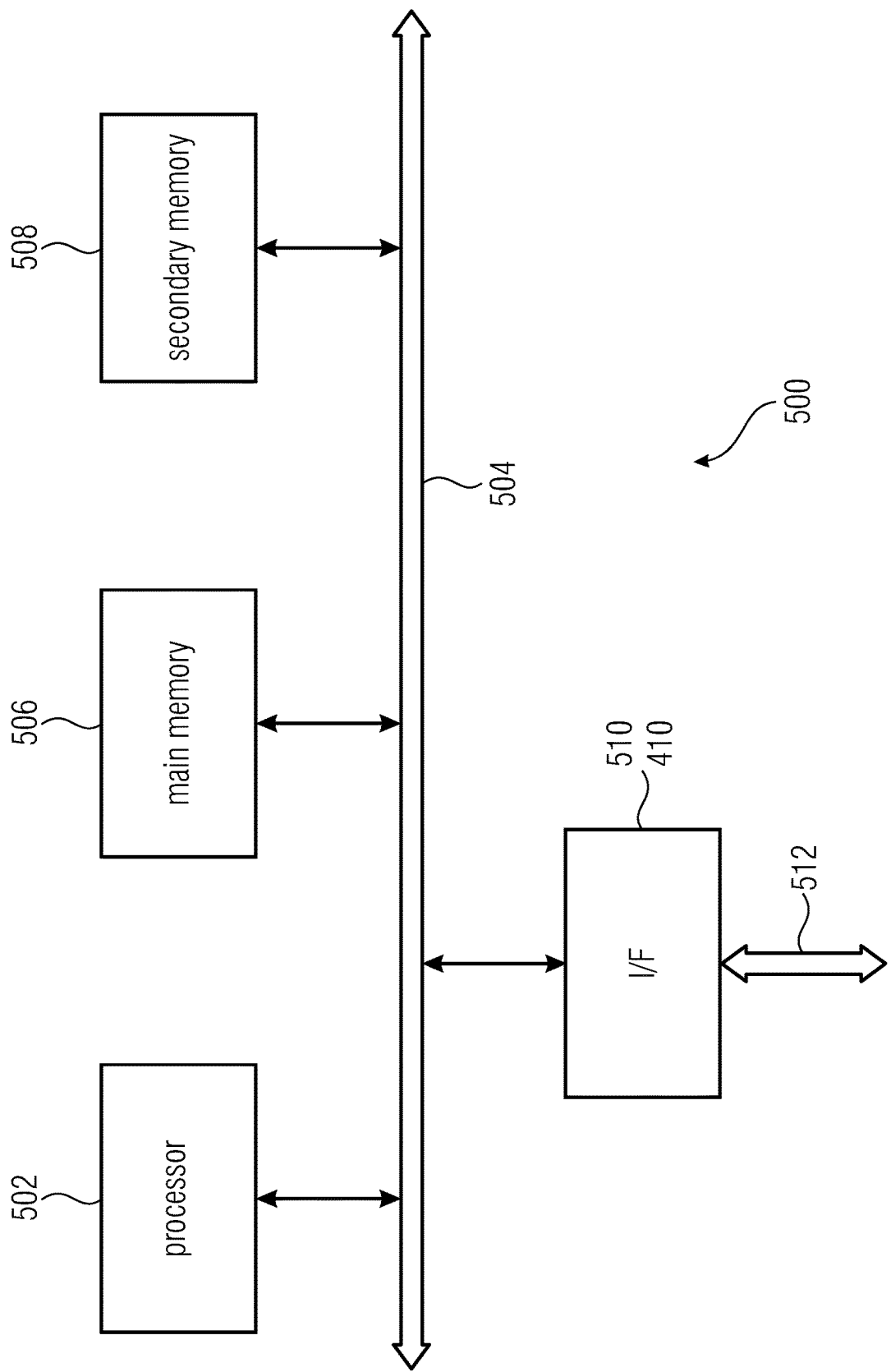
FIG. 16 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 16 illustrates an example of a computer system 500. The units or modules as well as the steps of the methods performed by these units may execute on one or more computer systems 500. The computer system 500 includes one or more processors 502, like a special purpose or a general purpose digital signal processor. The processor 502 is connected to a communication infrastructure 504, like a bus or a network. The computer system 500 includes a main memory 506, e.g., a random access memory (RAM), and a secondary memory 508, e.g., a hard disk drive and/or a removable storage drive. The secondary memory 508 may allow computer programs or other instructions to be loaded into the computer system 500. The computer system 500 may further include a communications interface 510 to allow software and data to be transferred between computer system 500 and external devices. The communication may be in the form electronic, electromagnetic, optical, or other signals capable of being handled by a communications interface. The communication may use a wire or a cable, fiber optics, a phone line, a cellular phone link, an RF link and other communications channels 512.

The terms "computer program medium" and "computer readable medium" are used to generally refer to tangible storage media such as removable storage units or a hard disk installed in a hard disk drive. These computer program products are means for providing software to the computer system 500. The computer programs, also referred to as computer control logic, are stored in main memory 506 and/or secondary memory 508. Computer programs may also be received via the communications interface 510. The computer program, when executed, enable the computer system 500 to implement the present invention. In particular, the computer program, when executed, enable processor 502 to implement the processes of the present invention, such as any of the methods described herein. Accordingly, such a computer program may represent a controller of the computer system 500. Where the disclosure is implemented using software, the software may be stored in a computer program product and loaded into computer system 500 using a removable storage drive, an interface, like communications interface 510.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] NGMN Alliance A White Paper "Small Cell Backhaul Requirements", Version 1.0, Jun. 4, 2012
[2] 3GPP TR 36.859 v13.0.0 (2015-12)

| Abbreviations | |
|---|---|
| eNB | Evolved Node B |
| LTE | Long-Term Evolution |
| IRC | Interference Rejection Combining |
| SIC | Successive Interference Cancellation |
| UE | User Equipment (User Terminal) |
| RRM | Radio Resource Management |
| TDD | Time Division Duplex |
| FDD | Frequency Division Duplex |
| MIMO | Multiple Input Multiple Output |
| OFDM | Orthogonal Frequency Division Duplexing |
| OFDMA | Orthogonal Frequency-Division Multiple Access |
| CQI | Channel Quality Information |
| CRC | Cyclic Redundancy Check |
| DMRS | Demodulation Reference Signal |
| SPS | Semi-persistent Scheduling |
| DCI | Downlink Control Information |
| UL | Uplink |
| DL | Downlink |
| (s)TTI | (short) Transmission Time Interval |
| PUSCH | Physical Uplink Shared Channel |
| PUCCH | Physical Uplink Control Channel |
| PDSCH | Physical Downlink Shared Channel |
| PDCCH | Physical Downlink Control Channel |
| SIC | Successive Interference Cancellation |
| URLLC | Ultra-reliable Low-latency Communications |
| MBSFN | Multimedia Broadcast Single Frequency Network |
| C-RNTI | Cell Radio Network Temporary Identity |

The invention claimed is:

1. A base station for a wireless communication network, the wireless communication network comprising a plurality of base stations, each base station to serve one or more users, wherein one or more users are served by a plurality of base stations to receive a first data signal from the base station and a second data signal from at least one further base station using multi-user superposition transmission, MUST, the base station comprising:
a backhaul interface for a communication with one or more of the plurality of base stations of the wireless communication network,
wherein, for transmitting the first data signal to one or more users served by the base station and by the further base station, the base station is configured to
negotiate a MUST setting with the further base station via the backhaul interface, and
map data of the first data signal using a first transmit constellation set according to the negotiated MUST setting,
wherein the MUST setting indicates one or more of the physical resources allocated to the one or more users for transmitting the first and second data signals, a power allocation for the one or more users, and information about the constellation maps used by the base stations, the constellation map representing a complex representation of the binary data, and
wherein the MUST setting indicates a phase offset between the constellation maps.

2. The base station of claim 1, wherein the further base station comprises a fixed phase for its constellation map, and wherein the base station is configured to receive from a user served by the further base station a phase offset between the base station and the further base station, and to apply the received phase offset to its constellation map.

3. The base station of claim 1, wherein the MUST setting indicates that during a first transmission period, data of the first data signal is mapped by the base station using a first MUST layer comprising a first transmit constellation and/or a first power allocation, and data of the second data signal is mapped by the further base station using a second MUST layer comprising a second transmit constellation and/or a second power allocation, and during a second transmission period, data of the first data signal is mapped by the base station using the second MUST layer, and data of the second data signal is mapped by the further base station using the first MUST layer.

4. The base station claim 3, wherein the constellation map comprises the power allocation, e.g., the length of a complex vector in the constellation map may represent the power.

5. The base station of claim 3, wherein the first MUST layer is a MUST-near layer, and the second MUST layer is a MUST-far layer.

6. The base station of claim 1, wherein the base station is configured to signal to the one or more users the MUST layer used for transmitting the first data signal.

7. The base station of claim 6, wherein the base station is configured to signal the MUST layer for a transmission time interval, TTI, in a static way, in a dynamic way, or by semi-persistent scheduling, SPS.

8. The base station of claim 1, wherein the base station is configured to map data of the second data signal using a second transmit constellation set according to the negotiated MUST setting, and transmit, via the backhaul interface, the mapped data of the second data signal to the further base station for wireless transmission to the one or more users by the further base station.

9. The base station of claim 1, wherein the base station and the further base station transmit the first and second data signals to a commonly served user.

10. The base station of claim 1, wherein the base station transmits the first data signal to a first user using MUST on resources used by the further base station to transmit the second data signal to a second user.

11. The base station of claim 10, wherein the base station is configured to receive, from the second user or via the further base station, a phase shift compensation signal, the phase shift compensation signal for reducing or compensating a phase offset between a first channel between the second user and the base station and a second channel between the second user and the further base station.

12. The base station of claim 1, wherein the base station is configured to exchange with the further base station information about the transmission power on the MUST resources to adjust the modulation and coding scheme, MCS, level according to an interference from the MUST layer used by the further base station.

13. The base station of claim 12, wherein the information about the transmission power on the MUST resources comprises resource and power allocations.

14. The base station of claim 13, wherein the transmitted information is an offset or interference estimate from the normal transmit power and not the actual power allocation.

15. The base station of claim 1, wherein the wireless communication network comprises one or more macro cell base stations and one or more small cell base stations, wherein the base station is a macro cell base station or a small cell base station.

16. The base station of claim 15, wherein the base station is a small cell base station receiving the MUST setting from the further base station, the further base station being a macro cell base station, or the base station is a macro cell base station sending the MUST setting to the further base station, the further base station being a small cell base station.

17. A user equipment for a wireless communication network, the wireless communication network comprising a plurality of base stations, each base station to serve one or more user equipments, wherein the user equipment is served by a plurality of base stations to receive a first data signal from a first base station and a second data signal from a second base station using multi-user superposition transmission, MUST, wherein the user equipment is configured to receive and apply MUST settings for performing demapping on a superposition of the first and second data signals to acquire information data per data signal, wherein the MUST setting indicates one or more of the physical resources allocated to the one or more users for transmitting the first and second data signals, a power allocation for the one or more users, and information about the constellation maps used by the base stations, the constellation map representing a complex representation of the binary data, and wherein the MUST setting indicates a phase offset between the constellation maps.

18. The user equipment of claim 17, wherein the user equipment is configured to measure and signal to the one or more base stations one or more of a phase offset between channels via which the user equipment receives the first and second data signals, an attenuation on the channels, and an interference on the channels.

19. A wireless communication network, comprising:

a plurality of base stations according to claim 1, and a plurality of users and/or a plurality of user equipments according to claim 17.

20. The wireless communication network of claim 19, wherein the base stations comprise one or more of a macro cell base station and a small cell base station; and the users or user equipments comprise one or more of mobile terminals, IoT devices, physical devices, ground based vehicles, aerial vehicles, drones, buildings and other items provided with network connectivity.

21. The communication network of claim 19, using an IFFT (Inverse Fast Fourier Transform) based signal, wherein the IFFT based signal comprises OFDM with CP, DFT-s-OFDM with CP, IFFT-based waveforms without CP, f-OFDM, FBMC, GFDM or UFMC.

22. A method for transmitting data to one or more users of a wireless communication network, the wireless communication network comprising a plurality of base stations, each base station to serve one or more users, wherein one or more users are served by a plurality of base stations to receive a first data signal from a first base station and a second data signal from at least a second base station using multi-user superposition transmission, MUST, the method comprising:
  negotiating a MUST setting between the first and second base stations via a backhaul interface connecting a plurality of the base stations of the wireless communication network,
  mapping, according to the negotiated MUST setting, data of the first data signal using a first transmit constellation set by the first base station, and data of the second data signal using a second transmit constellation set, by the second base station, and
  transmitting the first and second data signals by the first and second base station,
  wherein the MUST setting indicates one or more of the physical resources allocated to the one or more users for transmitting the first and second data signals, a power allocation for the one or more users, and information about the constellation maps used by the base stations, the constellation map representing a complex representation of the binary data, and
  wherein the MUST setting indicates a phase offset between the constellation maps.

23. A non-transitory digital storage medium having stored thereon a computer program for performing, when run by a computer, a method for transmitting data to one or more users of a wireless communication network, the wireless communication network comprising a plurality of base stations, each base station to serve one or more users, wherein one or more users are served by a plurality of base stations to receive a first data signal from a first base station and a second data signal from at least a second base station using multi-user superposition transmission, MUST, the method comprising:
  negotiating a MUST setting between the first and second base stations via a backhaul interface connecting a plurality of the base stations of the wireless communication network,
  mapping, according to the negotiated MUST setting, data of the first data signal using a first transmit constellation set by the first base station, and data of the second data signal using a second transmit constellation set, by the second base station, and
  transmitting the first and second data signals by the first and second base station,
  wherein the MUST setting indicates one or more of the physical resources allocated to the one or more users for transmitting the first and second data signals, a power allocation for the one or more users, and information about the constellation maps used by the base stations, the constellation map representing a complex representation of the binary data, and
  wherein the MUST setting indicates a phase offset between the constellation maps.

* * * * *